US008699391B2

United States Patent
Yeon et al.

(10) Patent No.: US 8,699,391 B2
(45) Date of Patent: Apr. 15, 2014

(54) METHODS FOR POWER HEADROOM REPORTING, RESOURCE ALLOCATION, AND POWER CONTROL

(75) Inventors: Myung Hoon Yeon, Gyeonggi-do (KR); Joon Young Cho, Gyeonggi-do (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 446 days.

(21) Appl. No.: 12/902,903

(22) Filed: Oct. 12, 2010

(65) Prior Publication Data

US 2011/0085483 A1 Apr. 14, 2011

(30) Foreign Application Priority Data

Oct. 9, 2009 (KR) .................. 10-2009-0096259
Apr. 5, 2010 (KR) .................. 10-2010-0031072

(51) Int. Cl.
*G08C 17/00* (2006.01)
(52) U.S. Cl.
USPC .......................................... 370/311
(58) Field of Classification Search
USPC .......................................... 370/311
See application file for complete search history.

(56) References Cited

U.S. PATENT DOCUMENTS

| 2009/0175187 | A1* | 7/2009 | Jersenius et al. | 370/252 |
| 2010/0297993 | A1* | 11/2010 | Heo et al. | 455/423 |
| 2011/0038271 | A1* | 2/2011 | Shin et al. | 370/252 |
| 2011/0080838 | A1* | 4/2011 | Larsson et al. | 370/252 |

FOREIGN PATENT DOCUMENTS

| CN | 101330313 | 12/2008 |
| CN | 101340711 | 1/2009 |
| CN | 101340712 | 1/2009 |
| WO | WO 2008-155469 | 12/2008 |
| WO | WO 2009-118367 | 10/2009 |
| WO | WO 2010-091425 | 8/2010 |

OTHER PUBLICATIONS

Samsung, "Concurrent PUSCH and PUCCH Transmissions", 3GPP TSG RAN WG1 #57bis, R1-092669, Jun. 29-Jul. 3, 2009.
Samsung, "UL Transmission Power Control in LTE-A", 3GPP TSG RAN WG1 #57bis, R1-092670, Jun. 29-Jul. 3, 2009.
Nokia Siemens Networks, Nokia Corporation, "Power Headroom Reporting for EUTRAN Uplink", R1-080329, 3GPP TSG RAN WG1 #51bis Meeting, Jan. 8, 2008.

* cited by examiner

*Primary Examiner* — Derrick Ferris
*Assistant Examiner* — Kodzovi Acolatse
(74) *Attorney, Agent, or Firm* — The Farrell Law Firm, P.C.

(57) ABSTRACT

A method and apparatus for power headroom reporting are provided. The power headroom reporting method for a mobile terminal may include determining whether a Physical Uplink Shared Channel (PUSCH) transmission and a Physical Uplink Control Channel (PUCCH) transmission are allowed to occur in a same subframe; determining whether an event for requesting power headroom reporting is generated; and reporting a first power headroom and a second power headroom to a base station.

28 Claims, 13 Drawing Sheets

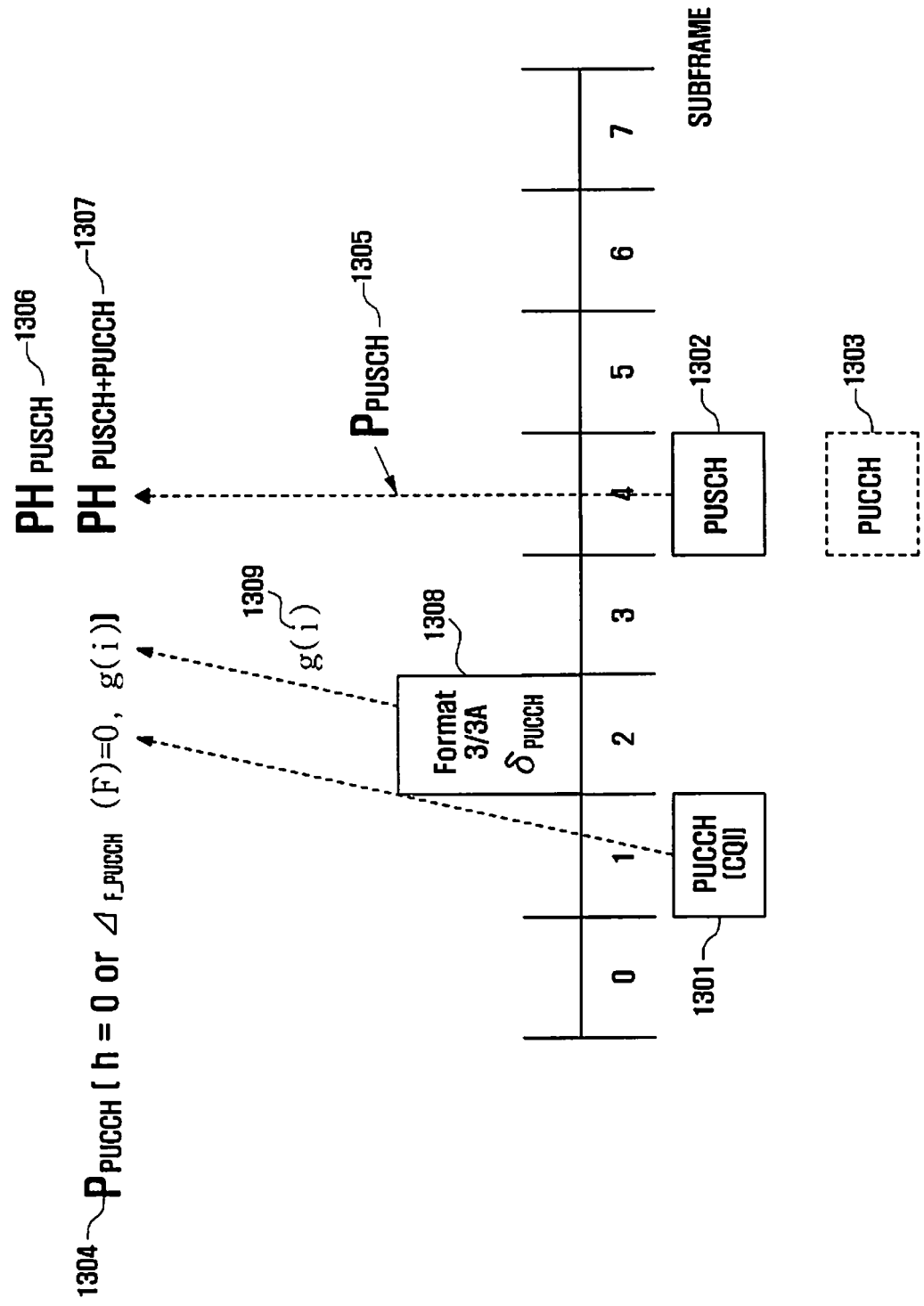

METHODS FOR POWER HEADROOM REPORTING, RESOURCE ALLOCATION, AND POWER CONTROL

PRIORITY

This application claims priority under 35 U.S.C. §119(a) to a Korean Patent Application filed in the Korean Intellectual Property Office on Oct. 9, 2009, and assigned Serial No. 10-2009-0096259 and to a Korean Patent Application filed in the Korean Intellectual Property Office on Apr. 5, 2010, and assigned Serial No. 10-2010-0031072, the contents of which are incorporated herein by reference.

BACKGROUND OF THE INVENTION

1. Field of the Invention

The present invention relates generally to power headroom reporting and, more particularly, to methods for resource allocation and power control based on power headroom reporting.

2. Description of the Related Art

In recent years, in order to achieve high-speed data transmission over radio channels of mobile communication systems, significant research efforts have been made to develop technologies related to Orthogonal Frequency Division Multiplexing (OFDM) and Single Carrier—Frequency Division Multiple Access (SC-FDMA). For example, the Long Term Evolution (LTE) system, which is regarded as a next-generation mobile communication system, employs OFDM for downlink and SC-FDMA for uplink. However, since OFDM has a high Peak-to-Average Power Ratio (PAPR), a large back-off is required for the input to the power amplifier to avoid nonlinear signal distortion, which lowers the maximum transmit power. This results in low power efficiency. The back-off sets the maximum transmit power to a level lower than the maximum power of the power amplifier, in order to ensure linearity of the transmit signal. For example, when the maximum power of the power amplifier is 23 dBm and the back-off is 3 dBm, the maximum transmit power becomes 20 dBm. OFDMA does not have any significant drawbacks as a downlink multiplexing technology, because the transmitter is located in a base station that has no power limitations. However, OFDMA has significant drawbacks, as an uplink multiplexing technology, because the transmitter is located in user equipment (such as a mobile terminal), which has severe power limitations. These limitations may reduce the terminal transmit power and service coverage. Consequently, SC-FDMA has been employed as uplink multiplexing technology for LTE, which is proposed by 3GPP (3rd Generation Partnership Project) as a fourth generation mobile communication system.

High-speed data transmission is required to provide diverse multimedia services in advanced wireless communication environments. In particular, considerable effort has been made to develop Multiple-Input and Multiple-Output (MIMO) technology for high-speed data transmission. MIMO employs multiple antennas to increase channel capacity within given frequency resource limitations. In scattering environments, use of multiple antennas may produce a channel capacity proportional to the number of antennas. Precoding is necessary in order to efficiently transmit data through MIMO. Precoding rules may be represented in a matrix form (precoding matrices), and a set of pre-defined precoding matrices is referred to as a codebook. In LTE Advanced (LTE-A), MIMO based on precoding matrices is recommended as a primary uplink technology enabling performance enhancement in both single-user and multi-user environments.

However, several problems exist when using an LTE-A system. First, the LTE-Advanced system allows simultaneous transmission over a Physical Uplink Shared Channel (PUSCH) and a Physical Uplink Control Channel (PUCCH). When a mobile terminal capable of simultaneous transmission sends a power headroom report containing only PUSCH transmit power information to a serving base station, the base station may adjust an amount of allocated PUSCH transmit power and other resources than are actually needed to the mobile terminal. In other words, cell interference may be increased due to excessive transmit power, or terminal link performance may be lowered due to insufficient transmit power.

Second, when a base station in an LTE-Advanced system schedules a MIMO transmission for a mobile terminal using the LTE scheduler, the base station may use the Sounding Reference Signal (SRS) from the mobile terminal to select precoding matrices that maximize uplink channel capacity. In MIMO transmission, one codeword may be mapped to transmission layers in different channel environments. However, a transmit power of each layer may be not adjusted using precoding matrices alone.

SUMMARY OF THE INVENTION

The present invention has been made in view of the above problems, and the present invention provides a power headroom reporting method that is suitable to cases in which transmissions over both PUCCH and PUSCH are allowed in the same subframe, and methods for resource allocation and power control using the same.

In accordance with an exemplary embodiment of the present invention, there is provided a power headroom reporting method for a mobile terminal, including determining whether a PUSCH transmission and a PUCCH transmission are allowed to occur in the same subframe; checking whether an event for requesting power headroom reporting is generated; and reporting a first power headroom and a second power headroom to the base station. The first power headroom is determined by subtracting a transmit power for the PUSCH transmission from a maximum transmit power according to a power class of the mobile terminal, and the second power headroom is given by subtracting the transmit power for the PUSCH transmission and a transmit power for the PUCCH transmission from the maximum transmit power according to the power class of the mobile terminal.

In accordance with another embodiment of the present invention, there is provided a power headroom reporting method for a mobile terminal, including reporting, upon detection of an event requesting power headroom reporting, by the mobile terminal, a first power headroom and a second power headroom to a base station.

In accordance with another embodiment of the present invention, there is provided an apparatus for power headroom reporting, including a mobile terminal for supporting a power headroom reporting function, and reporting, upon detection of an event requesting power headroom reporting, a first power headroom and a second power headroom to a base station.

In accordance with another embodiment of the present invention, there is provided a resource allocation method for a base station using power headroom reporting, including determining whether a mobile terminal is allowed to conduct both PUSCH transmission and PUCCH transmission in a same subframe; receiving, when the mobile terminal is allowed to conduct both the PUSCH transmission and the PUCCH transmission in the same subframe, from the mobile terminal, a report including a power headroom that is given by subtracting a transmit power for the PUSCH transmission and a transmit power for the PUCCH transmission from a maximum transmit power according to a power class of the mobile terminal; and allocating resources to the mobile terminal on a basis of the received power headroom in a scheduled subframe at which the mobile terminal conducts the PUSCH transmission and the PUCCH transmission.

In accordance with another embodiment of the present invention, there is provided an apparatus for power headroom reporting, including a base station for performing resource allocation using power headroom reporting, determining whether a mobile terminal is allowed to conduct both a PUSCH transmission and a PUCCH transmission in a same subframe, receiving, when the mobile terminal is allowed to conduct both the PUSCH transmission and the PUCCH transmission in the same subframe, a report including a power headroom that is determined by subtracting a transmit power for the PUSCH transmission and a transmit power for the PUCCH transmission from a maximum transmit power according to a power class of the mobile terminal, and allocating resources to the mobile terminal on a basis of the received power headroom in a scheduled subframe in which the mobile terminal conducts the PUSCH transmission and the PUCCH transmission.

According to an embodiment of the present invention, power headroom reporting, resource allocation and power control may be performed normally even when transmissions over both PUCCH and PUSCH are allowed in the same subframe.

BRIEF DESCRIPTION OF THE DRAWINGS

The features and advantages of the present invention will be more apparent from the following detailed description in conjunction with the accompanying drawings, in which:

FIG. 13 is a diagram illustrating power headroom reporting according to a seventh embodiment of the present invention.

DETAILED DESCRIPTION OF EMBODIMENTS OF THE INVENTION

Figure 1:
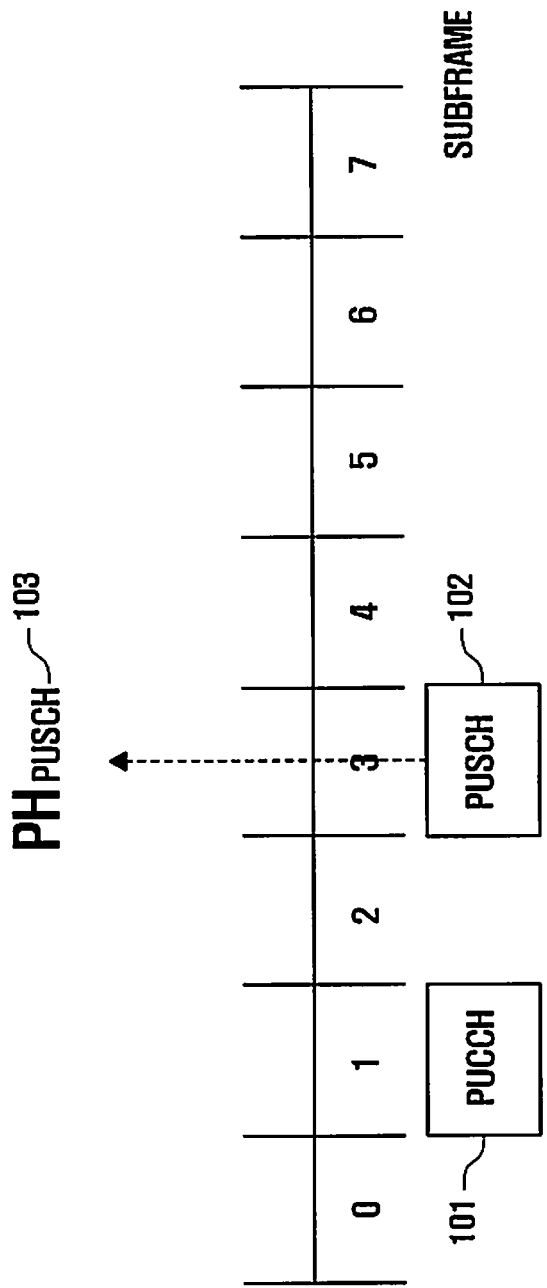
FIG. 1 is a diagram illustrating power headroom reporting in the LTE system where PUSCH transmission and PUCCH transmission are conducted in different subframes according to an embodiment of the present invention.

Hereinafter, embodiments of the present invention are described in detail with reference to the accompanying drawings. The same reference symbols are used throughout the drawings to refer to the same or similar parts. Detailed descriptions of well-known functions and structures incorporated herein may be omitted in order to avoid obscuring the subject matter of the present invention. Particular terms may be defined to describe the invention in the best manner. Accordingly, the meanings of specific terms or words used in the specification and the claims are not limited to the literal or commonly employed sense, but are to be construed in accordance with the spirit of the invention.

The description of embodiments of the present invention is focused on a wireless communication system based on OFDM, in particular, on the Third Generation Partnership Project (3GPP) Evolved Universal Terrestrial Radio Access (E-UTRA), or LTE system or an Advanced E-UTRA (or LTE-A) system. However, it should be apparent to those skilled in the art that the subject matter of the present invention is applicable to other communication systems having similar technical backgrounds and channel structures with or without minor changes or modifications.

In the LTE system, uplink power control may be described in terms of PUSCH power control, PUCCH power control, and power headroom reporting.

PUSCH Power Control refers to event-based power control is applied to PUSCH in the LTE uplink. In other words, when using PUSCH, it is unnecessary to periodically send Transmit Power Control (TPC) commands. The transmit power $P_{PUSCH}(i)$ for PUSCH transmission in a subframe i is given according to Equation 1:

$$P_{PUSCH}(i)=\min\{P_{CMAX}, 10\log_{10}(M_{PUSCH}(i))+P_{O\_PUSCH}(j)+\alpha(j)\cdot PL+\Delta_{TF}(i)+f(i)\}[dBm] \quad (1)$$

In Equation 1, $P_{CMAX}$ denotes the maximum transmit power according to the power class of a mobile terminal or User Equipment (UE); and $M_{PUSCH}(i)$ denotes PUSCH resource assignment expressed as a number of Resource Blocks (RB) valid for subframe i. Equation 1 shows that the transmit power for PUSCH transmission of a mobile terminal or UE increases in proportion to $M_{PUSCH}(i)$. In Equation 1, Path Loss (PL) denotes downlink path-loss estimate calculated at the terminal; and $\alpha(j)$ is a scaling factor that is determined by higher layers in consideration of mismatch between uplink path-loss and downlink path-loss due to cell configuration.

$P_{O\_PUSCH}$ of Equation 1 may be given by Equation 2, as follows:

$$P_{O\_PUSCH}(j)=P_{O\_NOMINAL\_PUSCH}(j)+P_{O\_UE\_PUSCH}(j) \quad (2)$$

In Equation 2, $P_{O\_NOMINAL\_PUSCH}(j)$ is a cell-specific parameter provided by higher layers; and $P_{O\_UE\_PUSCH}(j)$ is a UE-specific parameter provided by Radio Resource Control (RRC) signaling, as follows:

$\Delta_{TF}(i)$ of Equation 1 is a parameter for a Modulation and Coding Scheme (MCS) or a Transport Format (TF) compensation, and is given by Equation 3, as follows:

$$\Delta_{TF}(i) = \begin{cases} 10\log_{10}(2^{MPR(i)\cdot K_s} - 1) & \text{for } K_S = 1.25 \\ 0 & \text{for } K_S = 0 \end{cases} \quad (3)$$

In Equation 3, $K_s$ is a cell-specific parameter provided by RRC signaling.

MPR(i) is given by Equation 4, as follows:

$$MPR(i) = TBS(i)/(M_{PUSCH}(i) \cdot N^{RB}_{sc} \cdot 2N^{UL}_{Symb}) \quad (4)$$

In Equation 4, TBS(i) denotes the size of the transport block in subframe i, and the denominator ($M_{PUSCH}(i) \cdot N^{RB}_{sc} \cdot 2N^{UL}_{Symb}$) denotes the number of Resource Elements (RE) in subframe i. Namely, MPR(i) given by Equation 4 indicates the number of information bits per resource element. If $K_s=0$, MPR(i)=0, and hence MCS compensation is not considered. If $K_s=1.25$, 80 percent of the uplink channel (1/$K_s=0.8$) is MCS-compensated.

f(i) of Equation 1 indicates current PUSCH power control adjustment, and is given by Equation 5, as follows:

$$f(i) = f(i-1) + \delta_{PUSCH}(i-K_{PUSCH}) \quad (5)$$

$\delta_{PUSCH}$ is a UE-specific parameter known as a TPC command provided by the base station through a Physical Downlink Control Channel (PDCCH). $K_{PUSCH}$ of $\delta_{PUSCH}(i-K_{PUSCH})$ indicates presence of a time gap between $\delta_{PUSCH}$ reception and $\delta_{PUSCH}$ application to the transmission subframe. $\delta_{PUSCH}$ dB accumulated values signaled on PDCCH with Downlink Control Information (DCI) format 0 are −1, 0, 1 and 3. $\delta_{PUSCH}$ dB accumulated values signaled on PDCCH with DCI format 3/3A are −1 and 1 or −1, 0, 1 and 3.

In addition to use of $\delta_{PUSCH}$ accumulated values as in Equation 5, $\delta_{PUSCH}$ absolute values may be used as in Equation 6, as follows:

$$f(i) = \delta_{PUSCH}(i-K_{PUSCH}) \quad (6)$$

$\delta_{PUSCH}$ dB absolute values signaled on PDCCH with DCI format 0 are −4, −1, 1 and 4.

PUCCH Power Control: The transmit power $P_{PUCCH}(i)$ for PUCCH transmission in subframe i is given by Equation 7:

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}[\text{dBm}] \quad (7)$$

In Equation 7, $P_{CMAX}$ denotes the maximum transmit power according to the power class of the mobile terminal (or UE). $\Delta_{F\_PUCCH}(F)$ values correspond to PUCCH formats (F) and are provided by RRC signaling.

$P_{O\_PUCCH}$ is defined by Equation 8:

$$P_{O\_PUCCH} = P_{O\_NOMINAL\_PUCCH} + P_{O\_UE\_PUCCH} \quad (8)$$

In Equation 8, $P_{O\_NOMINAL\_PUCCH}$ is a cell-specific parameter provided by higher layers, and $P_{O\_UE\_PUCCH}$ is a UE-specific parameter provided by RRC signaling.

$h(n_{CQI}, n_{HARQ})$ is given by Equation 9, and is a PUCCH format dependent value, as follows:

$$h(n_{CQI}, n_{HARQ}) = 0, \text{ for PUCCH format 1, 1a, 1b} \quad (9)$$

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \text{ for PUCCH format 2, 2a, 2b}$$

$$h(n_{CQI}, n_{HARQ}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases}$$

for PUCCH format 2

$n_{CQI}$ corresponds to the number of information bits for the Channel Quality Indication (CQI), and $n_{HARQ}$ corresponds to the number of bits for the Hybrid Automatic Repeat reQuest (HARQ). Here, PUCCH format 1, 1a or 1b is used for ACK/NACK. Particularly, PUCCH format 1a may be used for calculating $h(n_{CQI}, n_{HARQ})$ according to an embodiment of the present invention.

g(i) denotes the current PUCCH power control adjustment and is given by Equation 10:

$$g(i) = g(i-1) + \delta_{PUCCH}(i-K_{PUCCH}) \quad (10)$$

$\delta_{PUCCH}$ is a UE-specific parameter known as a TPC command provided by the base station through PDCCH. $K_{PUCCH}$ of $\delta_{PUCCH}(i-K_{PUCCH})$ indicates presence of a time gap $K_{PUCCH}$ between the time of $\delta_{PUCCH}$ reception and the time of $\delta_{PUCCH}$ application to the transmission subframe.

The base station of the LTE system receives a Power Headroom Report (PHR) from the mobile terminal and uses PHR to schedule the mobile terminal by assigning the transmit power for PUSCH transmission and $M_{PUSCH}(i)$ in subframe i. Here, $M_{PUSCH}(i)$ denotes PUSCH resources allocated in subframe i and is represented as a number of resource blocks.

FIG. 1 is a diagram illustrating power headroom reporting in the LTE system where PUSCH transmission and PUCCH transmission are conducted in different subframes according to an embodiment of the present invention.

In the LTE system of FIG. 1, in order to avoid violating the Single Carrier (SC) property, PUCCH transmission and PUSCH transmission must be conducted in different subframes. Hence, as defined in Equation 11, the power headroom $PH_{PUSCH}$, to be reported by the mobile terminal to the base station, indicates the difference between the maximum transmit power according to the power class of the mobile terminal ($P_{CMAX}$) and the PUSCH transmit power calculated at subframe i ($P_{PUSCH}(i)$), as follows:

$$PH_{PUSCH}(i) = P_{CMAX} - P_{PUSCH}(i)[\text{dB}] \quad (11)$$

Events triggering power headroom reporting may include a significant change in path-loss estimation and expiration of a preset timer value.

First to third embodiments of the present invention, which are related to power headroom reporting, as described as follows.

First Embodiment of the Present Invention

Figure 2:
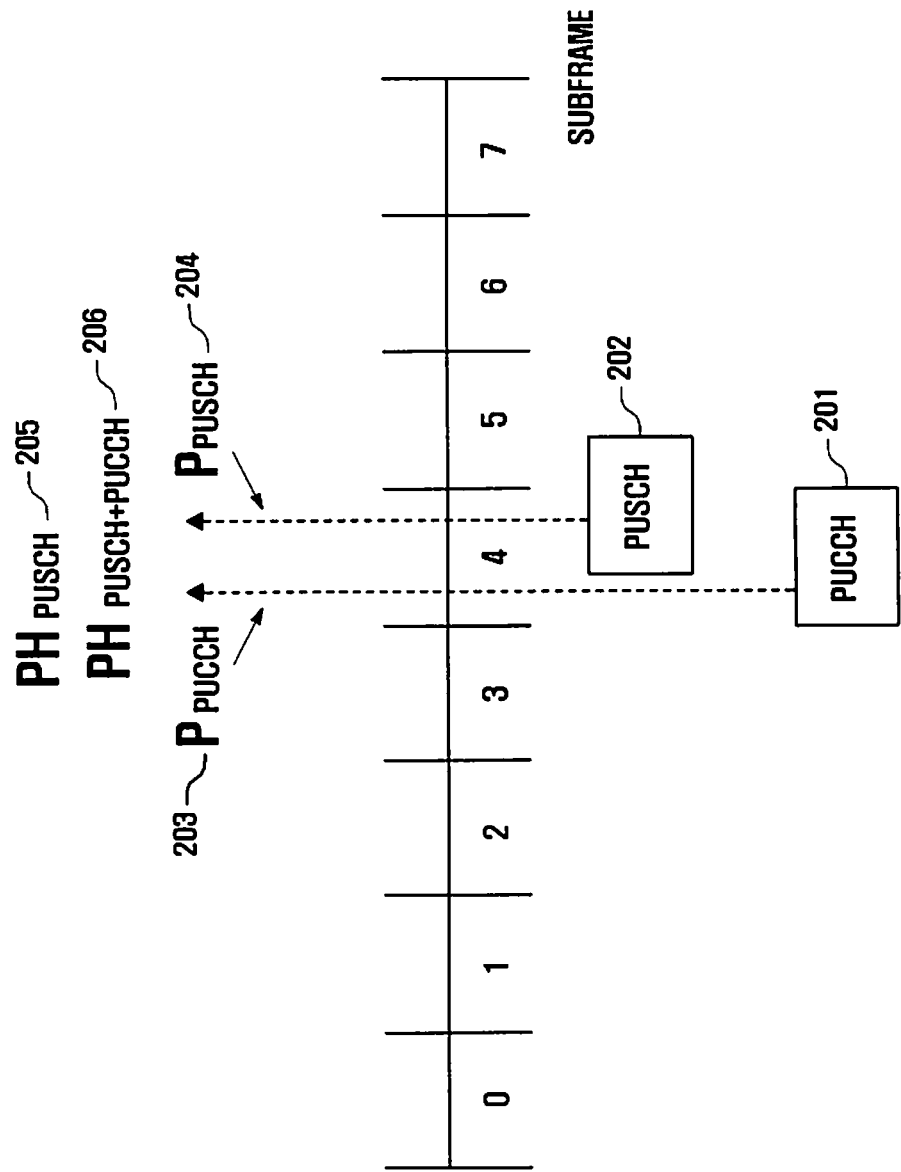
FIG. 2 is a diagram illustrating power headroom reporting according to a first embodiment of the present invention.

FIG. 2 is a diagram illustrating power headroom reporting according to the first embodiment of the present invention.

Referring to FIG. 2, in a case where the LTE-Advanced system allows transmissions over both PUSCH and PUCCH in the same subframe, in response to occurrence of an event requesting power headroom (PH) reporting, the mobile terminal may report $PH_{PUSCH}$ and $PH_{PUSCH+PUCCH}$ to the base station using Equation 12:

$$PH_{PUSCH+PUCCH}(i) = P_{CMAX} - P_{PUSCH}(i) - P_{PUCCH}(i)[\text{dB}]$$

$$PH_{PUSCH}(i) = P_{CMAX} - P_{PUSCH}(i)[\text{dB}] \quad (12)$$

Here, an event requesting power headroom reporting may correspond to reception of an external signal requesting power headroom reporting or detection of a predefined event requesting power headroom reporting, such as detection of a significant change in path-loss estimation, expiration of a preset timer value, or expiration of a preset period.

As in Equation 12, $PH_{PUSCH+PUCCH}$ 206 is given by subtracting the transmit power $P_{PUSCH}(i)$ 204 for PUSCH transmission 202 calculated in subframe i and the transmit power $P_{PUCCH}(i)$ 203 for PUCCH transmission 201 calculated in subframe i from the maximum transmit power according to the power class of the mobile terminal ($P_{CMAX}$). $PH_{PUSCH}$ 205 is given by subtracting the transmit power $P_{PUCCH}(i)$ 204 for PUSCH transmission 202 calculated in subframe i from the maximum transmit power according to the power class of the mobile terminal ($P_{CMAX}$). In FIG. 2, subframe number i is set to 4.

Figure 3:
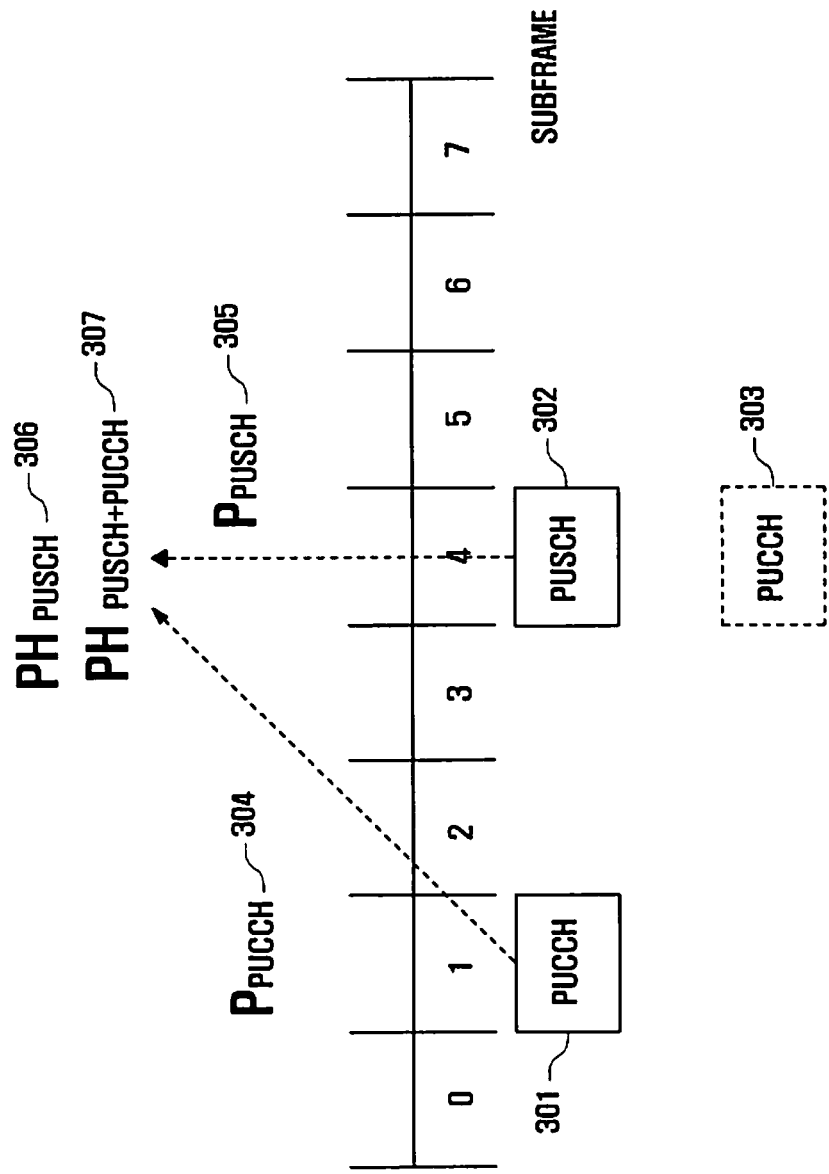
FIG. 3 is a diagram illustrating power headroom reporting according to the first embodiment of the present invention.

FIG. 3 is a diagram illustrating power headroom reporting according to the first embodiment of the present invention.

Referring to FIG. 3, in a case where the LTE-Advanced system allows transmissions over both PUSCH and PUCCH in the same subframe, in response to an occurrence of an event for requesting power headroom reporting, the mobile terminal may report $PH_{PUSCH}$ 306 and $PH_{PUSCH+PUCCH}$ 307 to the base station using Equation 12. $PH_{PUSCH+PUCCH}$ 307 is determined by subtracting the transmit power $P_{PUSCH}(i)$ 305 for PUSCH transmission 302 calculated in subframe i and the transmit power $P_{PUCCH}(i)$ 304 for PUCCH transmission 301 calculated in subframe i from the maximum transmit power according to the power class of the mobile terminal ($P_{CMAX}$). In FIG. 2, the transmit power $P_{PUSCH}$ 204 for PUSCH transmission 202 and the transmit power $P_{PUCCH}$ 203 for PUCCH transmission 201 are both calculated in subframe 4. Meanwhile, in FIG. 3, the transmit power $P_{PUCCH}$ 304 for PUCCH transmission 301 is calculated in subframe 1, and the transmit power $P_{PUSCH}$ 305 for PUSCH transmission 302 is calculated in subframe 4. As a PUCCH transmission (indicated by reference symbol 303) is not present in subframe 4, the transmit power $P_{PUCCH}$ 304 for the latest PUCCH transmission 301 is utilized for power headroom reporting in subframe 4. $PH_{PUSCH}$ 306 is determined by subtracting the transmit power $P_{PUSCH}(i)$ 305 for PUSCH transmission 302 calculated in subframe i from the maximum transmit power according to the power class of the mobile terminal ($P_{CMAX}$). In FIG. 3, subframe number i is set to 4.

Figure 4:
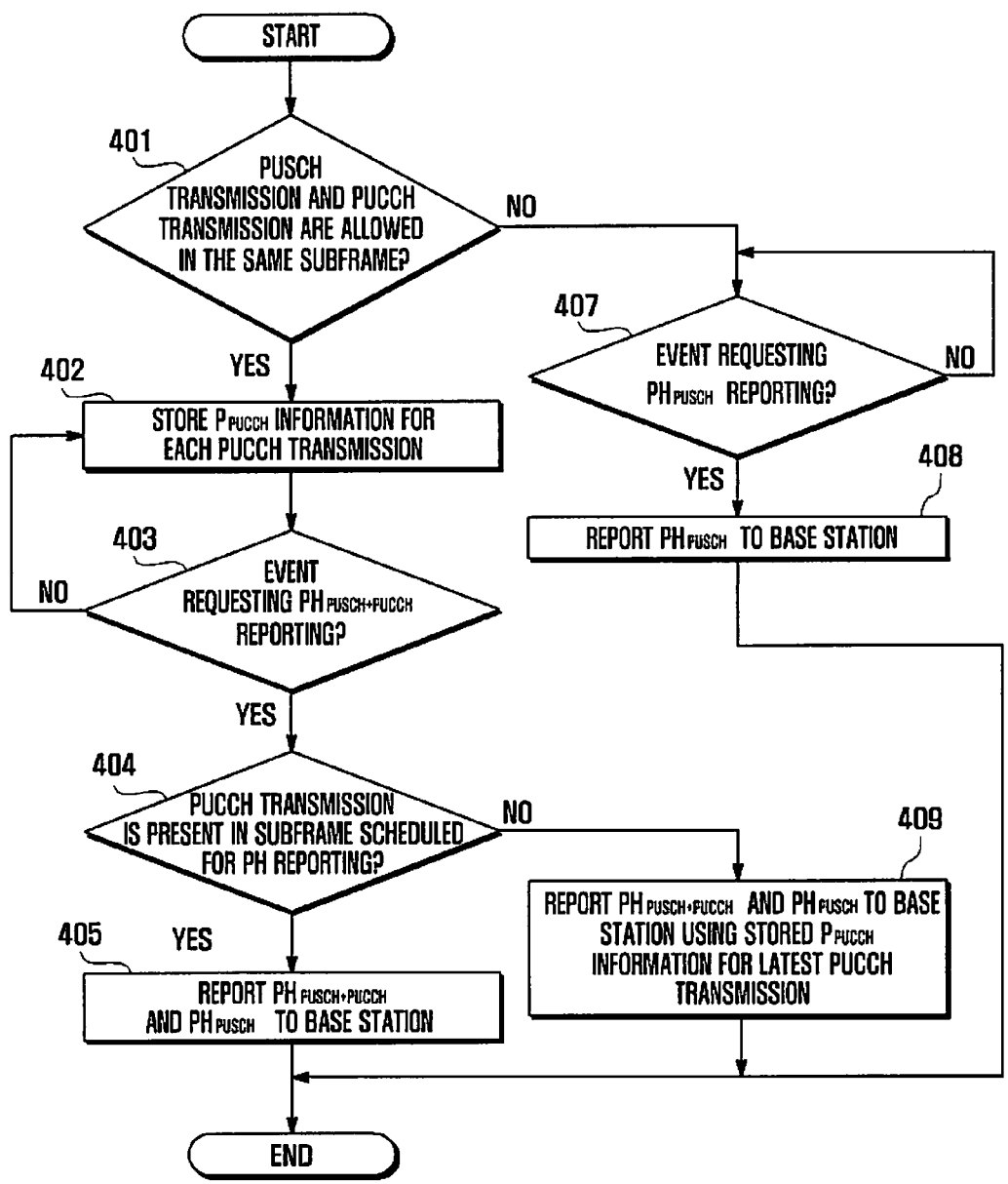
FIG. 4 is a flow chart illustrating a procedure for power headroom reporting performed by a mobile terminal according to the first embodiment of the present invention.

FIG. 4 is a flow chart illustrating a procedure for power headroom reporting performed by the mobile terminal according to the first embodiment of the present invention.

Referring to FIG. 4, the mobile terminal determines whether PUSCH transmission and PUCCH transmission are allowed to occur in the same subframe, in step 401. Permission for parallel transmission over both PUSCH and PUCCH in the same subframe may be indicated by signals from higher layers or the base station.

When PUSCH transmission and PUCCH transmission are not allowed in the same subframe (i.e., when PUSCH transmission and PUCCH transmission must occur in different subframes), the mobile terminal determines whether an event requesting $PH_{PUSCH}$ reporting has been generated, in step 407. When an event requesting $PH_{PUSCH}$ reporting has been generated, the mobile terminal reports $PH_{PUSCH}$ to the base station according to Equation 11, in step 408. When an event requesting $PH_{PUSCH}$ reporting has not been generated, the mobile terminal waits for generation of such an event.

When PUSCH transmission and PUCCH transmission are allowed to occur in the same subframe, the mobile terminal stores information regarding the transmit power $P_{PUCCH}$ for each PUCCH transmission, in step 402.

The mobile terminal determines whether an event requesting $PH_{PUSCH+PUCCH}$ reporting has been generated, in step 403. When an event requesting $PH_{PUSCH+PUCCH}$ reporting has not been generated, the mobile terminal returns to step 402.

When an event requesting $PH_{PUSCH+PUCCH}$ reporting is generated, the mobile terminal determines whether PUCCH transmission is present in subframe i, in step 404.

When PUCCH transmission is present in subframe i, the mobile terminal reports $PH_{PUSCH+PUCCH}$ and $PH_{PUSCH}$ to the base station using the transmit power $P_{PUCCH}(i)$ for PUCCH transmission in subframe i, in step 405.

When PUCCH transmission is not present in subframe i, the mobile terminal reports $PH_{PUSCH+PUCCH}$ and $PH_{PUSCH}$ to the base station using the stored transmit power $P_{PUCCH}$ for the latest PUCCH transmission, in step 409.

Figure 5:
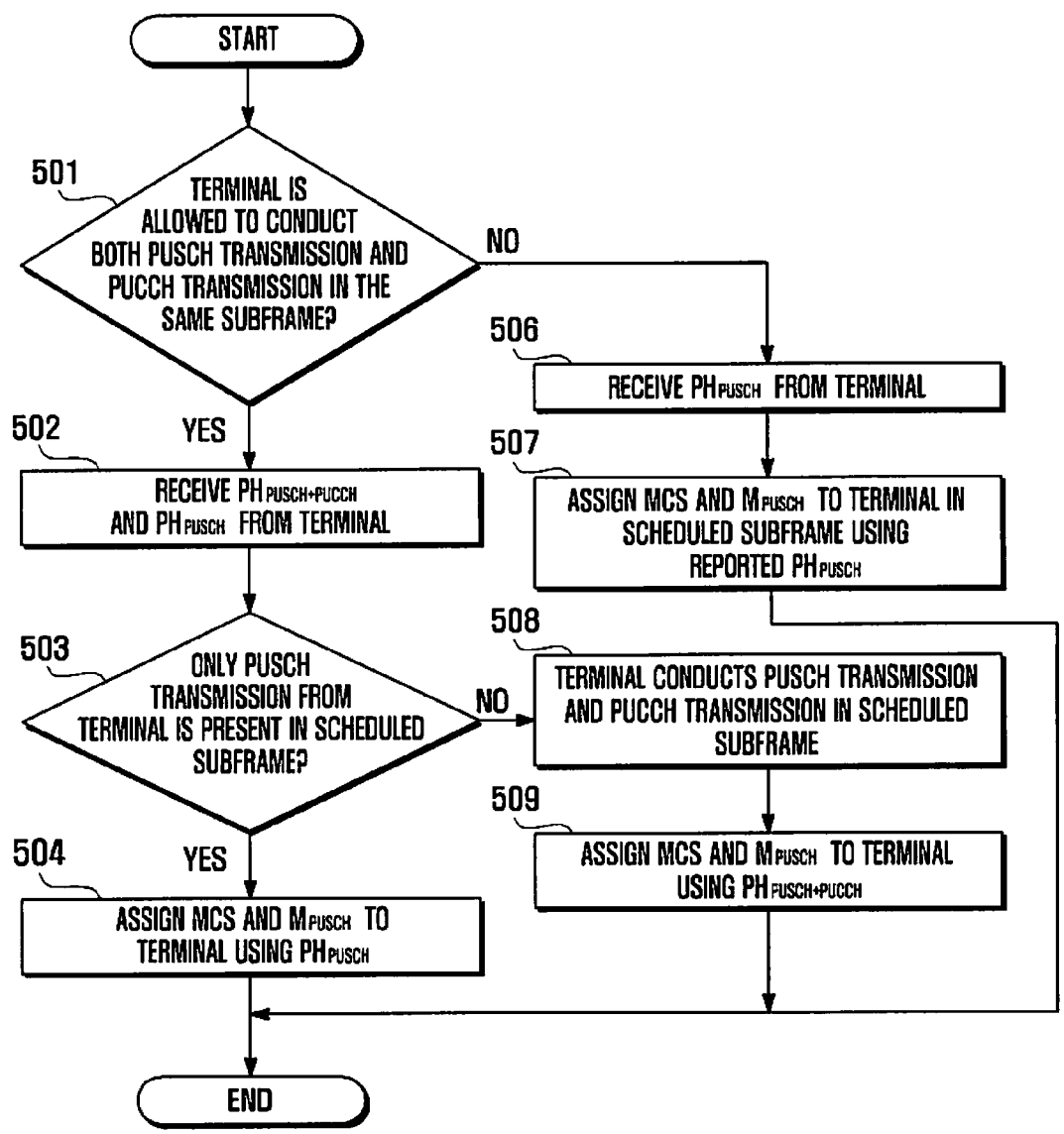
FIG. 5 is a flow chart illustrating a procedure for power headroom reporting performed by a base station according to the first embodiment of the present invention.

FIG. 5 is a flow chart illustrating a procedure for power headroom reporting performed by the base station according to the first embodiment of the present invention.

Referring to FIG. 5, the base station determines whether the mobile terminal is allowed to conduct both PUSCH transmission and PUCCH transmission in the same subframe, in step 501.

When the mobile terminal is allowed to conduct PUSCH transmission and PUCCH transmission in the same subframe, the base station receives $PH_{PUSCH+PUCCH}$ and $PH_{PUSCH}$ from the mobile terminal in a subframe where a corresponding event is generated, in step 502.

The base station determines whether both PUSCH transmission and PUCCH transmission are present in a scheduled subframe at which a PUCCH transmission from the mobile terminal is present, in step 503.

When only PUSCH transmission is present in the scheduled subframe at which a PUCCH transmission from the mobile terminal is present, the base station assigns MCS and $M_{PUSCH}$ to the mobile terminal using reported $PH_{PUSCH}$, in step 504.

When both PUSCH transmission and PUCCH transmission are present in the scheduled subframe at which a PUCCH transmission from the mobile terminal is present, the mobile terminal conducts PUSCH transmission and PUCCH transmission in the scheduled subframe, in step 508.

The base station assigns MCS and $M_{PUSCH}$ to the mobile terminal using the reported $PH_{PUSCH+PUCCH}$, in step 509.

When it is determined that the mobile terminal is not allowed to conduct PUSCH transmission and PUCCH transmission in the same subframe at step 501, the base station receives $PH_{PUSCH}$ from the mobile terminal, in step 506, and assigns MCS and $M_{PUSCH}$ to the mobile terminal in a scheduled subframe using reported $PH_{PUSCH}$, in step 507.

Second Embodiment of the Present Invention

According to the first embodiment of the present invention, when a PUCCH transmission is not present in subframe 4, the stored transmit power $P_{PUCCH}$ for the latest PUCCH transmission in an earlier subframe is utilized. For example, in FIG. 3, the transmit power for PUCCH transmission 301 in subframe 1 is used in subframe 4. However, $h(n_{CQI}, n_{HARQ})$ given by Equation 9 may have different values according to PUCCH formats. If the format expected by the base station is different from that actually used by the mobile terminal, a problem may arise with regard to power control. For example, the base station may expect to receive a PH report containing a $h(n_{CQI}, n_{HARQ})$ value calculated for format 1, 1a or 1b from the mobile terminal. However, the mobile terminal may fail to receive PDSCH (Physical Downlink Shared Channel) information from the base station. In this case, the mobile terminal may send a PH report containing a $h(n_{CQI}, n_{HARQ})$ value calculated for format 2, 2a or 2b to the base station.

To prevent such miscommunication, the mobile terminal may send a PH report with $h(n_{CQI}, n_{HARQ})$=0 to the base station whenever a predetermined condition for sending the PH report is met. That is, $P_{PUCCH}$ may be calculated by Equation 13:

$$P_{PUCCH}(i)=\min\{P_{CMAX}, P_{O\_PUCCH}+PL\Delta_{F\_PUCCH}(F)+g(i)\}[\text{dBm}] \quad (13)$$

Alternatively, $P_{PUCCH}$ may be calculated according to Equation 14, where $\Delta_{F\_PUCCH}(F)$=0, as follows:

$$P_{PUCCH}(i)=\min\{P_{CMAX}, P_{O\_PUCCH}+PL+g(i)\}[\text{dBm}] \quad (14)$$

When the base station and mobile terminal agree to use $P_{PUCCH}(i)$, as defined by Equation 13 or Equation 14, in processing $PH_{PUSCH+PUCCH}$, the base station may re-compute $PH_{PUSCH+PUCCH}$ using $PH_{PUSCH+PUCCH}$, and $h(n_{CQI}, n_{HARQ})$ and $A_{F\_PUCCH}(F)$ expected by the base station scheduler.

Figure 6:
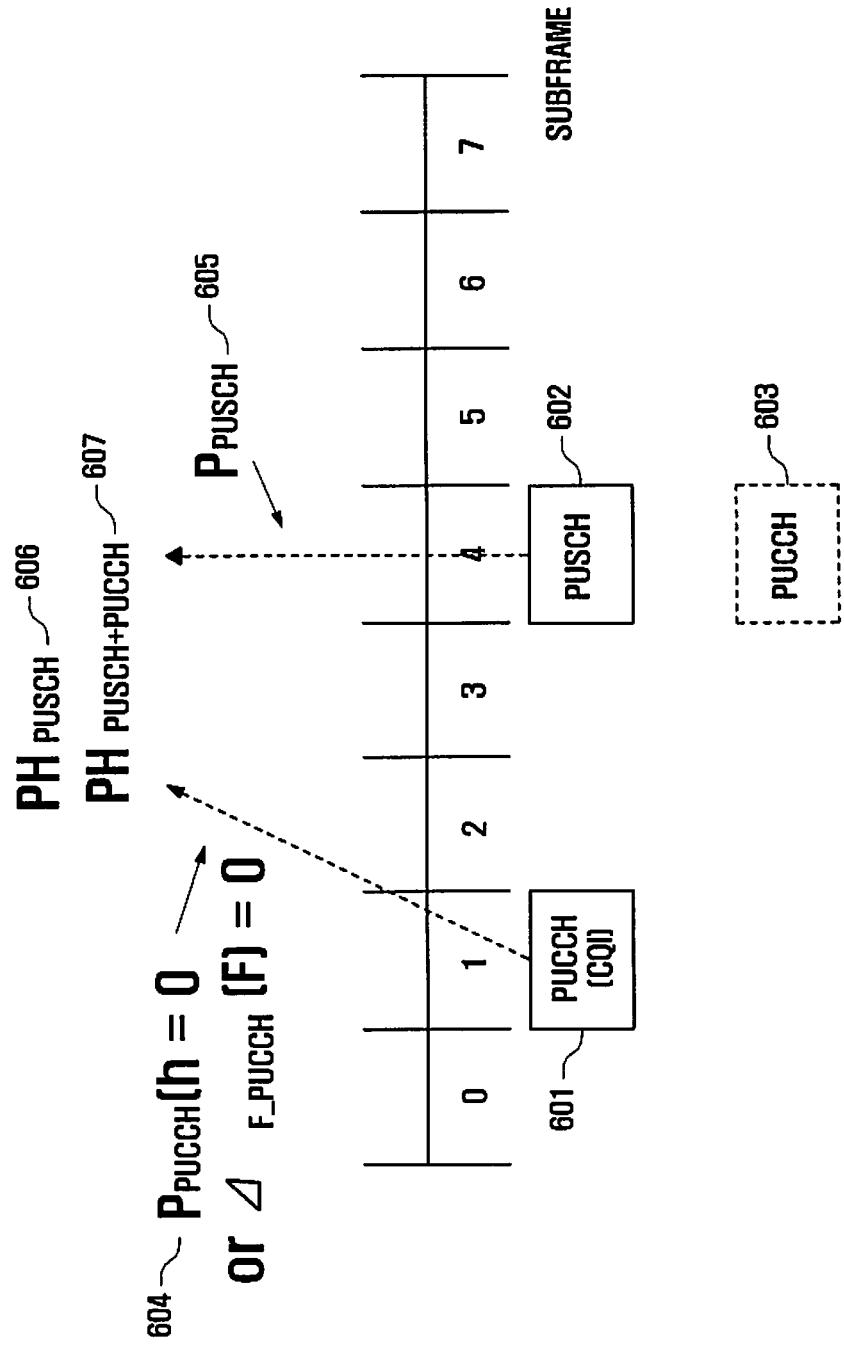
FIG. 6 is a diagram illustrating power headroom reporting according to a second embodiment of the present invention.

FIG. 6 is a diagram illustrating power headroom reporting according to the second embodiment of the present invention.

Referring to FIG. 6, in the case where the LTE-Advanced system allows transmission over both PUSCH and PUCCH in the same subframe, in response to occurrence of an event requesting power headroom reporting, the mobile terminal may report $PH_{PUSCH}$ 606 and $PH_{PUSCH+PUCCH}$ 607 to the base station using Equations 12, 13 or 14. $PH_{PUSCH+PUCCH}$ 607 is determined by subtracting the transmit power $P_{PUSCH}$ 605 for PUSCH transmission 602 calculated in subframe 4 and the transmit power $P_{PUCCH}$ 604 for PUCCH transmission 601 calculated in subframe 4 from the maximum transmit power according to the power class of the mobile terminal ($P_{CMAX}$). PUCCH transmission 601 is initially used for CQI information. The difference between $P_{PUCCH}$ 304 of FIG. 3 and $P_{PUCCH}$ 604 of FIG. 6 is that information as to $P_{PUCCH}$ 604 related to PUCCH transmission 601 is obtained according to Equations 13 or 14.

Figure 7:
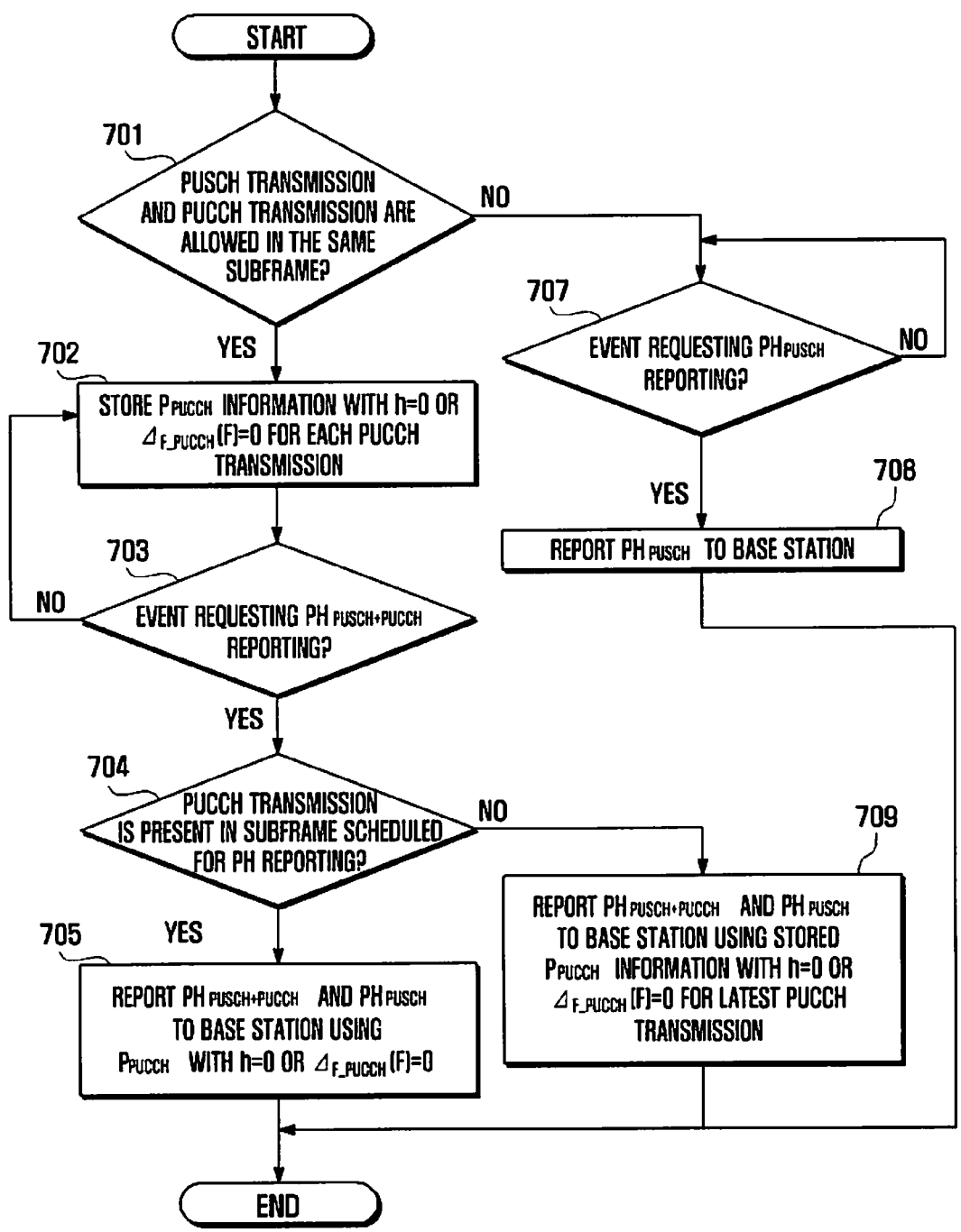
FIG. 7 is a flow chart illustrating a procedure for power headroom reporting performed by a mobile terminal according to the second embodiment of the present invention.

FIG. 7 is a flow chart illustrating a procedure for power headroom reporting performed by a mobile terminal according to the second embodiment of the present invention.

Referring to FIG. 7, the mobile terminal determines whether PUSCH transmission and PUCCH transmission are allowed to occur in the same subframe, in step 701. Permission for parallel transmission over both PUSCH and PUCCH in the same subframe may be signaled from higher layers or the base station.

When PUSCH transmission and PUCCH transmission are not allowed to occur in the same subframe (i.e., PUSCH transmission and PUCCH transmission must occur in different subframes), the mobile terminal determines whether an event requesting $PH_{PUSCH}$ reporting is generated, in step 707. When an event requesting $PH_{PUSCH}$ reporting is generated, the mobile terminal reports $PH_{PUSCH}$ to the base station according to Equation 11, in step 708.

When PUSCH transmission and PUCCH transmission are allowed to occur in the same subframe, the mobile terminal stores information regarding the transmit power $P_{PUCCH}$ for each time PUCCH transmission is performed, in step 702. Here, the transmit power $P_{PUCCH}$ is calculated according to Equations 13 or 14.

The mobile terminal determines whether an event requesting $PH_{PUSCH+PUCCH}$ reporting has been generated, in step 703. When an event requesting $PH_{PUSCH+PUCCH}$ reporting has not been generated, the mobile terminal returns to step 702.

When an event requesting $PH_{PUSCH+PUCCH}$ reporting is generated in subframe i, the mobile terminal checks whether PUCCH transmission is present in subframe i, in step 704.

When PUCCH transmission is present in subframe i, the mobile terminal reports $PH_{PUSCH+PUCCH}$ and $PH_{PUSCH}$ to the base station using the transmit power $P_{PUCCH}(i)$ for PUCCH transmission in subframe i, in step 705. Here, the transmit power $P_{PUCCH}(i)$ may be calculated using Equations 13 or 14.

When PUCCH transmission is not present in subframe i, the mobile terminal reports $PH_{PUSCH+PUCCH}$ and $PH_{PUSCH}$ to the base station using the stored transmit power $P_{PUCCH}$ for the latest PUCCH transmission, in step 709.

Figure 8:
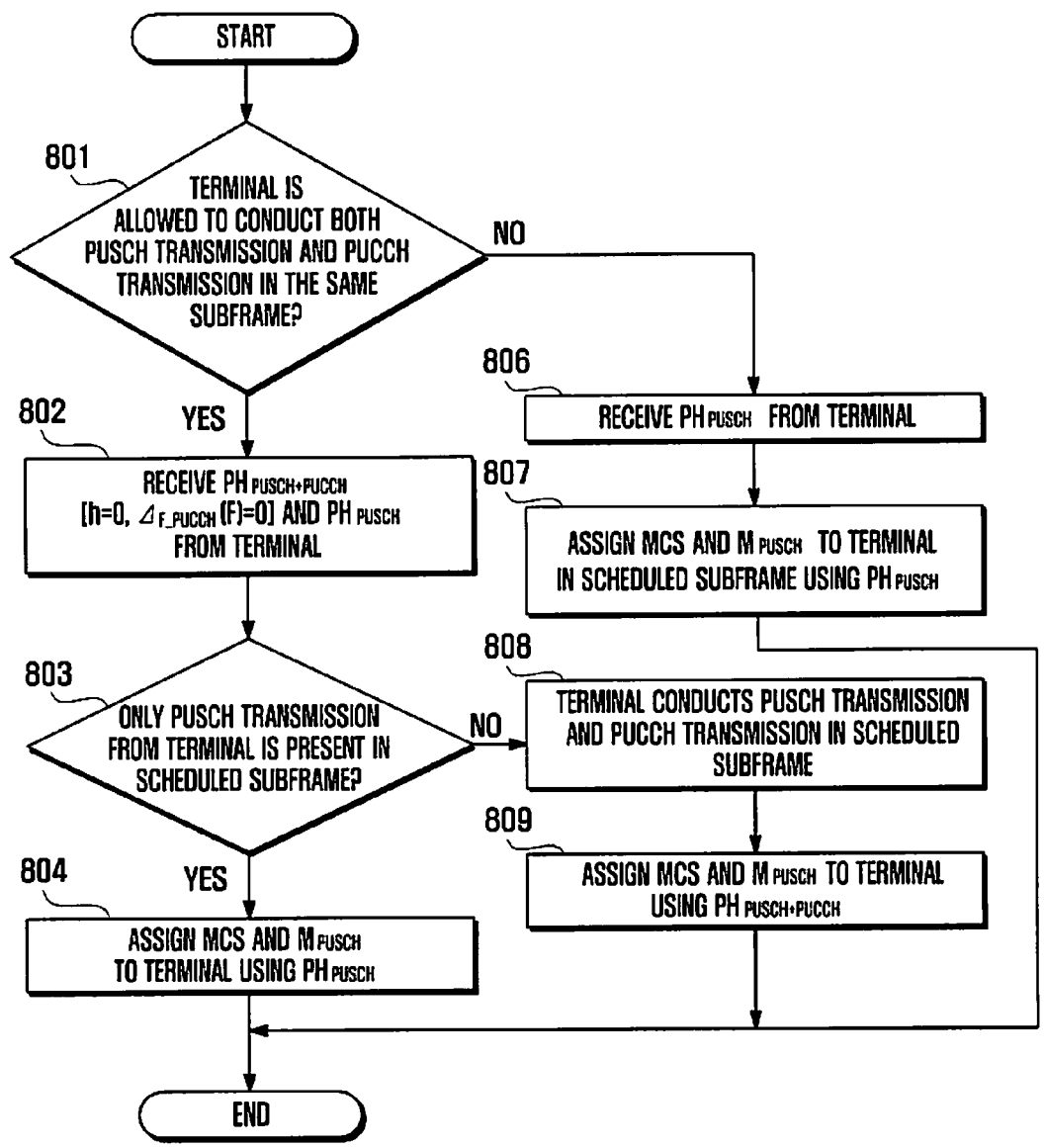
FIG. 8 is a flow chart illustrating a procedure for power headroom reporting performed by a base station according to the second embodiment of the present invention.

FIG. 8 is a flow chart of illustrating procedure for power headroom reporting performed by the base station according to the second embodiment of the present invention.

Referring to FIG. 8, the base station determines whether the mobile terminal is allowed to conduct both PUSCH transmission and PUCCH transmission in the same subframe, in step 801.

When the mobile terminal is allowed to conduct PUSCH transmission and PUCCH transmission in the same subframe, the base station receives $PH_{PUSCH+PUCCH}$ and $PH_{PUSCH}$ from the mobile terminal in a subframe where a corresponding event is generated, in step 802.

The base station determines whether both a PUSCH transmission and a PUCCH transmission from the mobile terminal are present or only a PUSCH transmission is present in a scheduled subframe, in step 803.

When only a PUSCH transmission is present in the scheduled subframe, the base station assigns MCS and $M_{PUSCH}$ to the mobile terminal using reported $PH_{PUSCH}$, in step 804.

When both PUSCH transmission and PUCCH transmission are present in the scheduled subframe, the mobile terminal conducts PUSCH transmission and PUCCH transmission in the scheduled subframe, in step 808.

After the transmission of step 808, the base station assigns MCS and $M_{PUSCH}$ to the mobile terminal using reported $PH_{PUSCH+PUCCH}$, in step 809.

When it is determined that the mobile terminal is not allowed to conduct PUSCH transmission and PUCCH transmission in the same subframe at step 801, the base station receives $PH_{PUSCH}$ from the mobile terminal, in step 806.

After the assignment of step 806, the base station assigns MCS and $M_{PUSCH}$ to the mobile terminal in a scheduled subframe using reported $PH_{PUSCH}$, in step 807.

Third Embodiment of the Present Invention

Figure 9:
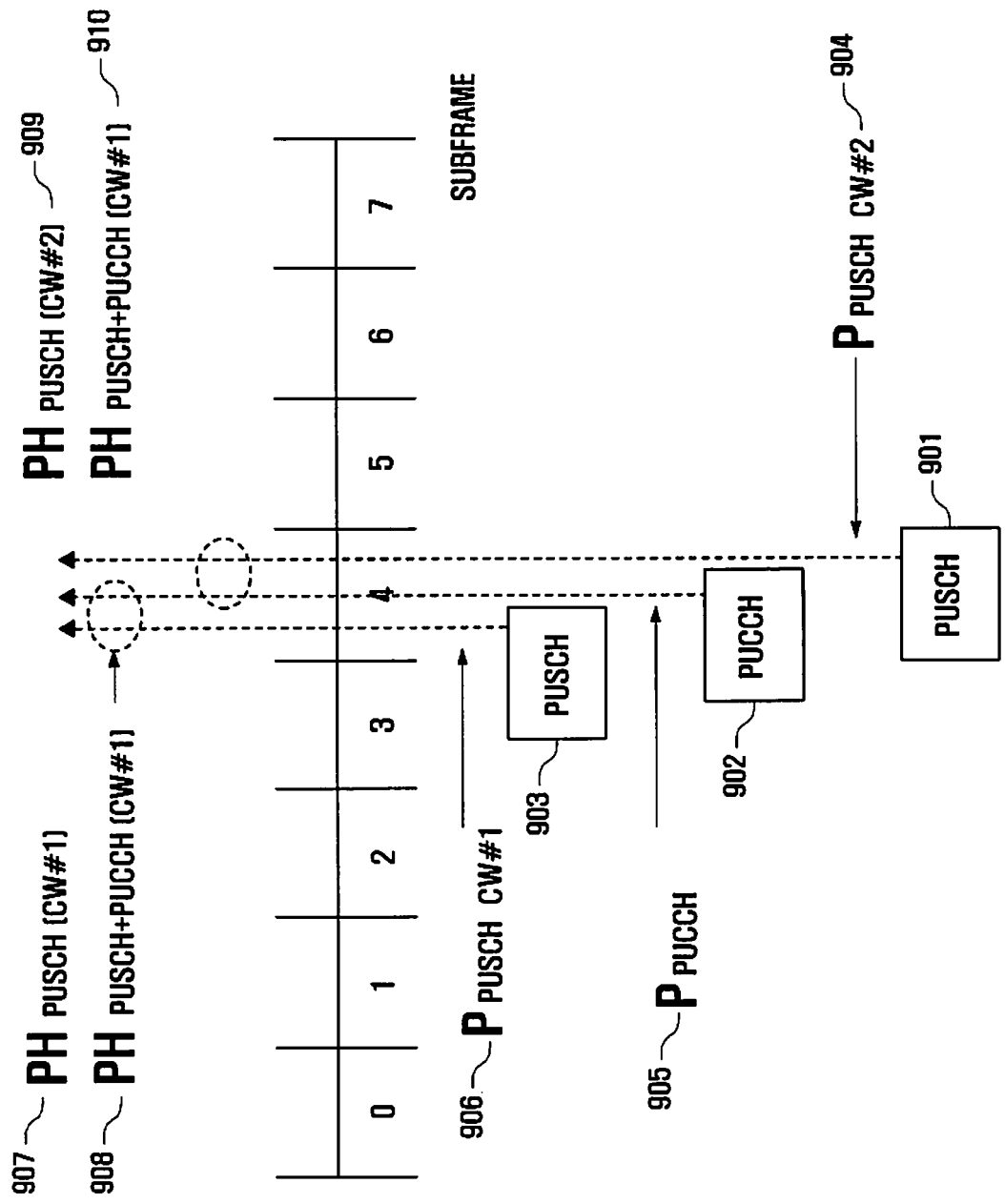
FIG. 9 is a diagram illustrating power headroom reporting according to a third embodiment of the present invention.

FIG. 9 is a diagram illustrating power headroom reporting according to a third embodiment of the present invention.

Referring to FIG. 9, when of transmitting two CodeWords (CW) CW #1 and CW #2, $PH_{PUSCH+PUCCH}$(CW #1) and $PH_{PUSCH+PUCCH}$(CW #2), the two codewords may be separately reported according to Equation 15:

$$PH_{PUSCH+PUCCH}(i,CW\ \#1)=P_{CMAX}-P_{PUSCH}(i,CW\ \#1)-P_{PUCCH}(i)[\text{dB}]$$

$$PH_{PUSCH}(i,CW\ \#1)=P_{CMAX}-P_{PUSCH}(i,CW\ \#1)[\text{dB}]$$

$$PH_{PUSCH+PUCCH}(i,CW\ \#2)=P_{CMAX}-P_{PUSCH}(i,CW\ \#2)-P_{PUCCH}(i)[\text{dB}]$$

$$PH_{PUSCH}(i,CW\ \#2)=P_{CMAX}-P_{PUSCH}(i,CW\ \#2)[\text{dB}] \quad (15)$$

Power headroom reporting for each codeword may be necessary in the following case. When two codewords CW #1 and CW #2 to be transmitted are present, CW #1 may be in the process of retransmission while CW #2 has been successfully transmitted. In addition, when power control is performed independently for individual codewords, power headroom reporting for each codeword may be necessary.

Referring to FIG. 2, in the case of the LTE-Advanced system allowing transmission over both PUSCH and PUCCH in the same subframe, in response to occurrence of an event requesting Power Headroom (PH) reporting, the mobile terminal may report $PH_{PUSCH}$(CW #1) 907, $PH_{PUSCH+PUCCH}$ (CW #1) 908, $PH_{PUSCH}$(CW #2) 909 and $PH_{PUSCH+PUCCH}$ (CW #2) 910 to the base station using Equation 15 on the basis of transmit power $P_{PUCCH}$ 905 of PUCCH transmission 902, transmit power $P_{PUSCH}$(CW #1) 906 of PUSCH transmission 903 related to the codeword CW #1, and transmit power $P_{PUSCH}$(CW #2) 904 of PUSCH transmission 901 related to the codeword CW #2.

As in Equation 15, $PH_{PUSCH+PUCCH}$(CW #1) 908 is determined by subtracting the transmit power $P_{PUSCH}$(CW #1) 906 of PUSCH transmission 903 related to the codeword CW #1 calculated in subframe i and the transmit power $P_{PUCCH}$ 905 of PUCCH transmission 902 from the maximum transmit power according to the power class of the mobile terminal ($P_{CMAX}$). $PH_{PUSCH+PUCCH}$(CW #1) 910 is determined by subtracting the transmit power $P_{PUSCH}$(CW #2) 904 of PUSCH transmission 901 related to the codeword CW #2 calculated in subframe i and the transmit power $P_{PUCCH}$ 905 of PUCCH transmission 902 from the maximum transmit power according to the power class of the mobile terminal ($P_{CMAX}$).

$PH_{PUSCH}$(CW #1) 907 is determined by subtracting the transmit power $P_{PUSCH}$(CW #1) 906 of PUSCH transmission 903 related to the codeword CW #1 calculated in subframe i from the maximum transmit power according to the power class of the mobile terminal ($P_{CMAX}$). $PH_{PUSCH}$(CW #2) 909 is determined by subtracting the transmit power $P_{PUSCH}$(CW #2) 904 of PUSCH transmission 901 related to the codeword CW #2 calculated in subframe i from the maximum transmit power according to the power class of the mobile terminal ($P_{CMAX}$).

Figure 10:
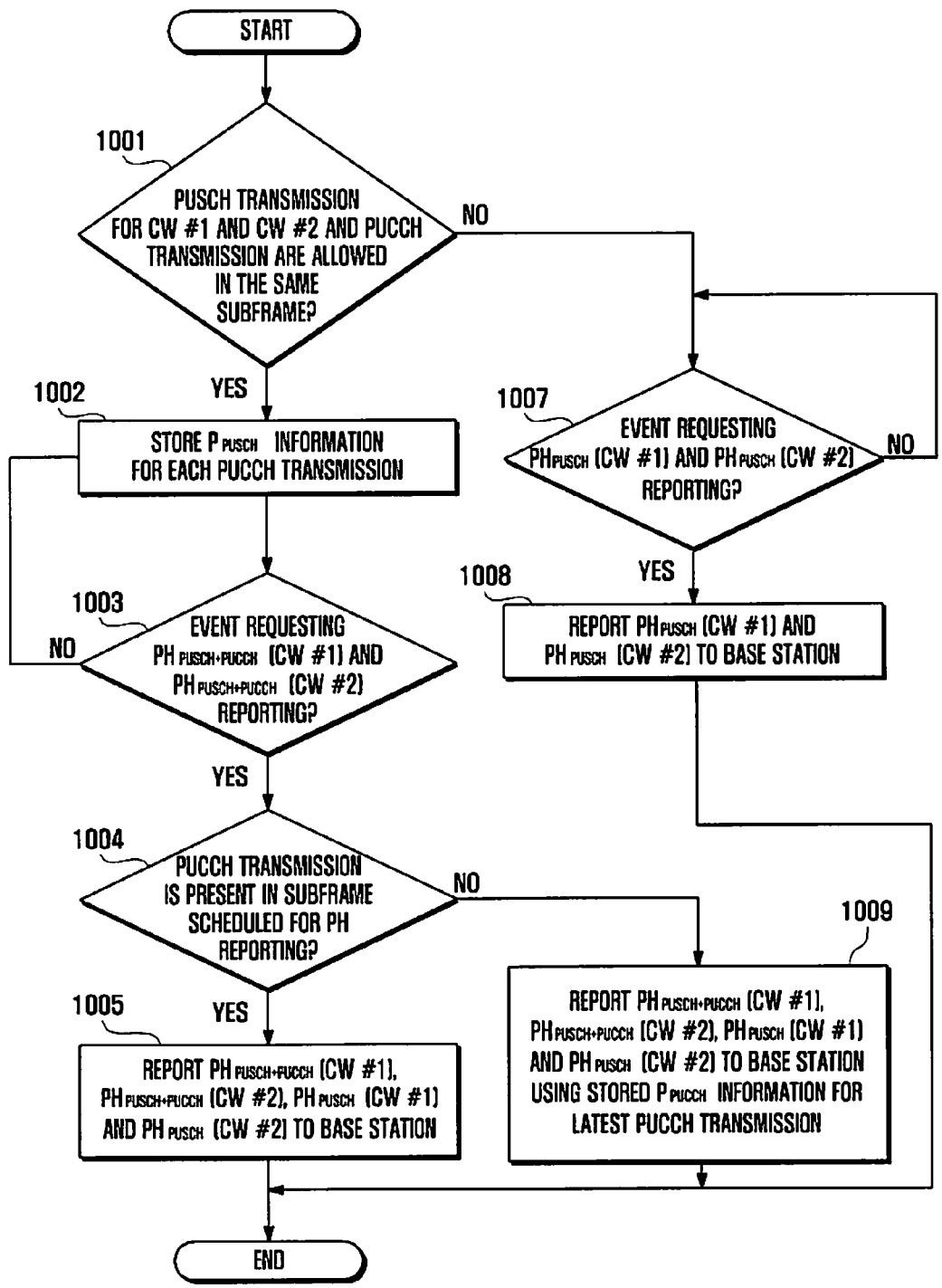
FIG. 10 is a flow chart illustrating a procedure for power headroom reporting performed by a mobile terminal according to the third embodiment of the present invention.

FIG. 10 is a flow chart illustrating a procedure for power headroom reporting performed by the mobile terminal according to the third embodiment of the present invention.

Referring to FIG. 10, the mobile terminal determines whether PUSCH transmission for CW #1 and CW #2 and PUCCH transmission are allowed to occur in the same subframe, in step 1001. Permission for parallel transmission over both PUSCH and PUCCH in the same subframe may be signaled from higher layers or the base station.

When PUSCH transmission and PUCCH transmission are not allowed to occur in the same subframe (i.e., PUSCH transmission and PUCCH transmission must occur in different subframes), the mobile terminal determines whether an event requesting $PH_{PUSCH}$(CW #1) and $PH_{PUSCH}$(CW #2) reporting has been generated, in step 1007. When an event requesting $PH_{PUSCH}$(CW #1) and $PH_{PUSCH}$(CW #2) reporting is generated, the mobile terminal reports $PH_{PUSCH}$(CW #1) and $PH_{PUSCH}$(CW #2) to the base station according to Equation 15, in step 1008.

When PUSCH transmission and PUCCH transmission are allowed to occur in the same subframe, the mobile terminal stores information regarding the transmit power $P_{PUCCH}$ for each PUCCH transmission, in step 1002.

The mobile terminal determines whether an event requesting $PH_{PUSCH+PUCCH}$(CW #1) and $PH_{PUSCH+PUCCH}$(CW #2) reporting has been generated, in step 1003. When an event requesting $PH_{PUSCH+PUCCH}$(CW #1) and $PH_{PUSCH+PUCCH}$ (CW #2) reporting has not been generated, the mobile terminal returns to step 1002.

When an event requesting $PH_{PUSCH+PUCCH}$(CW #1) and $PH_{PUSCH+PUCCH}$(CW #2) reporting is generated in subframe i, the mobile terminal determines whether PUCCH transmission is present in subframe I, in step 1004.

When PUCCH transmission is present in subframe i, the mobile terminal reports $PH_{PUSCH+PUCCH}$(CW #1), $PH_{PUSCH+PUCCH}$(CW #2), $PH_{PUSCH}$(CW #1) and $PH_{PUSCH}$ (CW #2) to the base station using the transmit power $P_{PUCCH}$ (i) for PUCCH transmission in subframe i, in step 1005.

When a PUCCH transmission is not present in subframe i, the mobile terminal reports $PH_{PUSCH+PUCCH}$(CW #1), $PH_{PUSCH+PUCCH}$(CW #2), $PH_{PUSCH}$(CW #1) and $PH_{PUSCH}$ (CW #2) to the base station using the stored transmit power $P_{PUCCH}$ for the latest PUCCH transmission, in step 1009.

Fourth to sixth embodiments of the present invention, which are related to per-layer power control, are described as follows.

Fourth Embodiment of the Present Invention

For per-layer power control, the base station may signal precoding matrices and differences between powers of layers to the mobile terminal. The base station determines the number of ranks and precoding matrices that maximize the channel capacity of the uplink on the basis of Sounding Reference Signals (SRS) from the mobile terminal and codebooks. When one codeword is mapped to two layers, the base station signals information regarding powers assigned to the two layers to the mobile terminal. Here, powers may be assigned to the two layers according to SINR (signal to interference-plus-noise ratio) equality (i.e., SINR of one layer equals that of the other layer) or according to channel quality (i.e., assigning more power to one layer having higher channel quality, like water filling). For example, when the base station determines the number of ranks for the mobile terminal to be three, codeword CW #1 of the mobile terminal is mapped to layer #1 and codeword CW #2 is mapped to layer #2 and layer #3. In addition to precoding matrix information, the base station provides information on the power difference between layer #2 and layer #3 to the mobile terminal. For example, two bits may be used to represent four values [−3, −1, 1, 3] dB. When the base station signals −3 dB, the mobile terminal sets the transmit power of layer #3 to −3 dB of the transmit power of layer #2.

In addition to [−3, −1, 1, 3], other cases such as [−6, −3, 3, 6] and [−3, −1, 0, 1] may be considered. For a rank 3 transmission, when four bits are used to represent 16 precoding matrices and two bits are used to represent power differences between the layers, the base station provides a total of six bits of information to the mobile terminal.

Fifth Embodiment of the Present Invention

Table 1 illustrates cases in which a single codeword may be mapped to two layers. Referring to Table 1, when there is one codeword and two layers, CW #1 is mapped to layer #1 and layer #2. In order to represent and signal four power differences [−3, −1, 1, 3] dB between layer #1 and layer #2, two bits are necessary. In the case where two codewords are mapped to three layers, CW #2 is mapped to layer #2 and layer #3, and two bits are necessary to represent power differences between layer #2 and layer #3. In the case where two codewords are mapped to four layers, as CW #1 is mapped to layer #1 and layer #2, CW #2 is mapped to layer #3 and layer #4, and two bits are necessary to represent power differences between layer #1 and layer #2 and two bits are necessary to represent power differences between layer #3 and layer #4.

TABLE 1

| Number of codewords | Number of layers | Layer mapping | Number of bits to represent transmit power differences between two layers |
|---|---|---|---|
| 1 | 2 | Map CW #1 to layer #1 and layer #2 | 2 bits |
| 2 | 3 | Map CW #1 to layer #1 | 0 bit |
|   |   | Map CW #1 to layer #2 and layer #3 | 2 bits |
| 2 | 4 | Map CW #1 to layer #1 and layer #2 | 2 bits |
|   |   | Map CW #1 to layer #3 and layer #4 | 2 bits |

Figure 11:
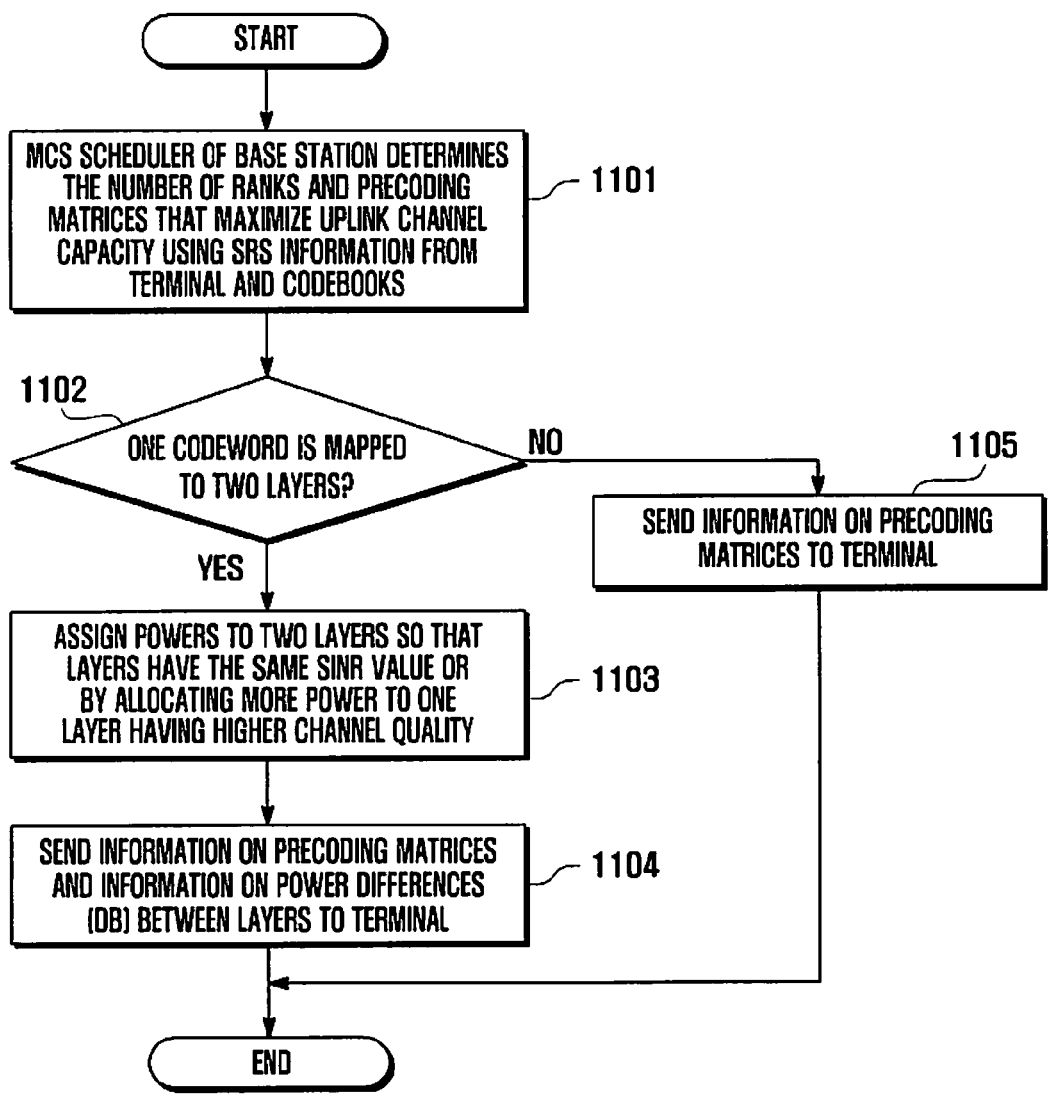
FIG. 11 is a flow chart illustrating a procedure for per-layer power control performed by a base station according to a fifth embodiment of the present invention.

FIG. 11 is a flow chart illustrating a procedure for per-layer power control performed by the base station according to the fifth embodiment of the present invention.

Referring to FIG. 11, the MCS scheduler of the base station determines the number of ranks and precoding matrices that maximize the channel capacity of the uplink on the basis of SRS information from the mobile terminal and codebooks, in step 1101.

The base station determines whether one codeword is mapped to two layers, in step 1102.

When one codeword is mapped to two layers, the base station assigns powers to the two layers so that the two layers have the same SINR value or by allocating more power to one layer having higher channel quality (such as according to a water filling algorithm), in step 1103.

The base station signals information on the precoding matrices and information on power differences between the layers to the mobile terminal, in step 1104.

When one codeword is not mapped to two layers, the base station outputs signals including information regarding the precoding matrices and the power difference between layers set to 0 dB to the mobile terminal, in step 1105.

Sixth Embodiment of the Present Invention

Table 2 illustrates cases in which each of two codewords may be mapped to two layers.

TABLE 2

| Number of codewords | Number of layers | Layer mapping | Number of bits to represent transmit power differences between two layers |
|---|---|---|---|
| 2 | 3 | Map CW #1 to layer #1 Map CW #2 to layer #2 and layer #3 | 4 bits: 2 bits for power differences between layer #1 and layer, and 2 bits for power differences between layer #1 and layer #3 (relative to layer #1) |
| 2 | 4 | Map CW #1 to layer #1 and layer #2 Map CW #2 to layer #3 and layer #4 | 6 bits: 2 bits for power differences between layer #1 and layer #2, 2 bits for power differences between layer #1 and layer #3, and 2 bits for power differences between #1 layer and layer #4 (relative to layer #1) |

Referring to Table 2, in a case where two codewords are mapped to three layers, CW #1 is mapped to layer #1 and CW #2 is mapped to layer #2 and layer #3. Four bits are necessary if two bits are allocated to represent power differences between layer #1 and layer #2 and two bits are allocated to represent power differences between layer #1 and layer #3. In a case where two codewords are mapped to four layers, CW #1 is mapped to layer #1 and layer #2 and CW #2 is mapped to layer #3 and layer #4. Six bits are necessary in a case where two bits are allocated to represent power differences between layer #1 and layer #2, two bits are allocated to represent power differences between layer #1 and layer #3, and two bits are allocated to represent power differences between layer #1 and layer #4.

Figure 12:
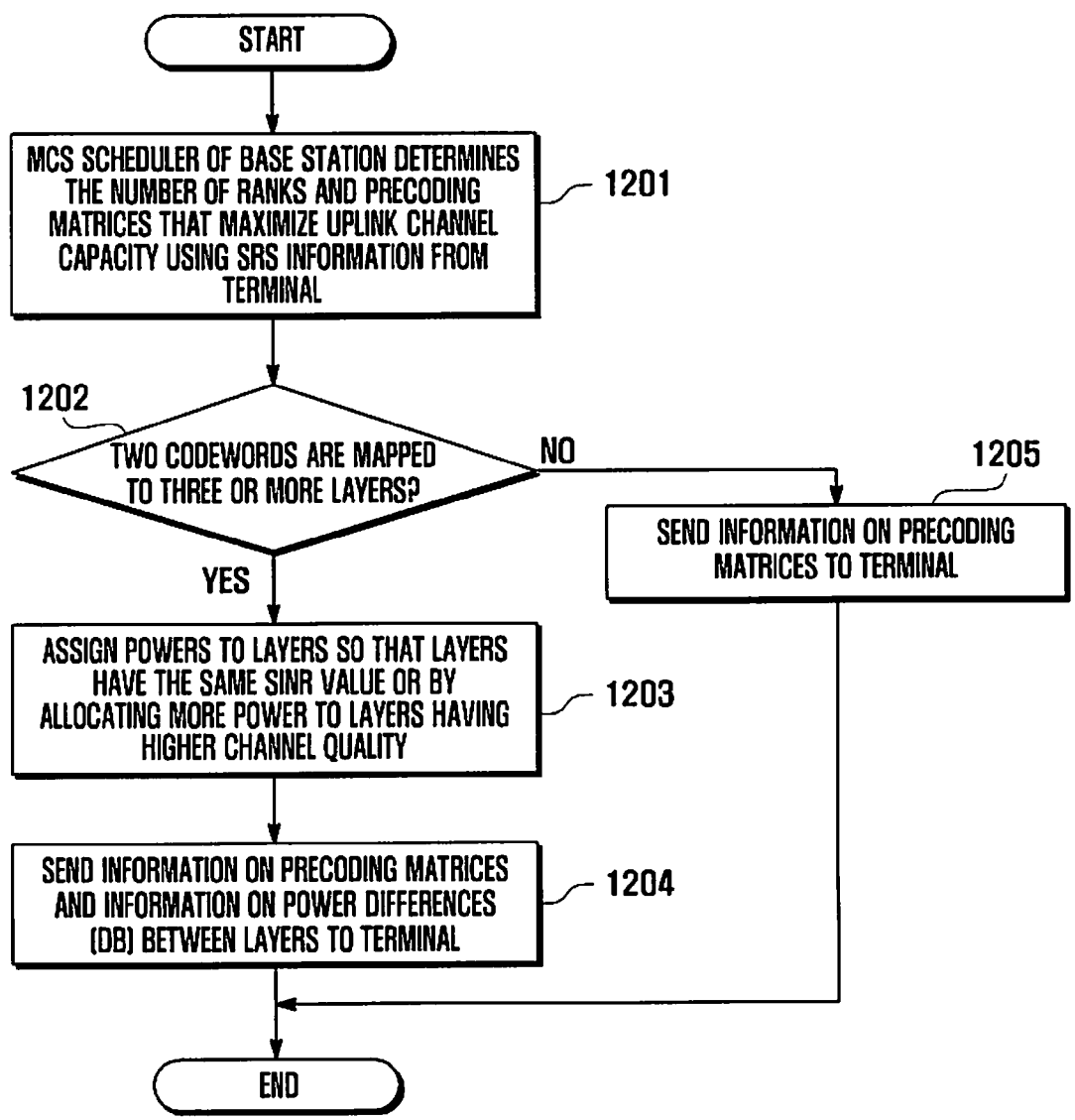
FIG. 12 is a flow chart illustrating a procedure for per-layer power control performed by a base station according to a sixth embodiment of the present invention.

FIG. 12 is a flow chart illustrating a procedure for per-layer power control performed by the base station according to the sixth embodiment of the present invention.

Referring to FIG. 12, the base station determines a number of ranks and precoding matrices that maximize the channel capacity of the uplink on the basis of SRS information from the mobile terminal and codebooks, in step 1201.

The base station determines whether two codewords are mapped to three or more layers, in step 1202. When two codewords are mapped to three or more layers, the base station assigns powers to the layers so that the layers have the same SINR value or allocates more power to layers that have higher channel qualities (such as according to a water filling algorithm), in step 1203.

The base station outputs signals including information regarding the precoding matrices and information regarding power differences between the layers to the mobile terminal, in step 1204.

When two codewords are mapped to less than three layers, the base station outputs signals including information regarding the precoding matrices and the power difference between layers set to 0 dB to the mobile terminal, in step 1205.

Seventh Embodiment of the Present Invention

According to the first embodiment of the present invention, when a PUCCH transmission is not present in a subframe, the stored transmit power $P_{PUCCH}$ of the latest PUCCH transmission is utilized. According to the second embodiment of the present invention, in order to prevent a problem in power control caused by different $h(n_{CQI}, n_{HARQ})$ values depending on PUCCH formats, the mobile terminal sends a PH report with $h(n_{CQI}, n_{HARQ})=0$ or $\Delta_{F\_PUCCH}(F)=0$ to the base station, i.e., when the base station and mobile terminal agree to use $P_{PUCCH}(i)$ according to Equation 13 or Equation 14 in processing $PH_{PUSCH+PUCCH}$, the base station may re-compute $PH_{PUSCH+PUCCH}$ using $PH_{PUSCH+PUCCH}$, and $h(n_{CQI}, n_{HARQ})$ and $\Delta_{F\_PUCCH}(F)$ expected by the base station scheduler.

The seventh embodiment of the present invention is an extension of the first and second embodiments of the present invention. According to the seventh embodiment of the present invention, when $\delta_{PUCCH}$ values (for example, [−1, 0, 1, 3] or [−1, 1]) are signaled to the mobile terminal through a PDCCH with DCI format 3/3A, g(i), such as in Equations 13 or 14, is updated using the $\delta_{PUCCH}$ values signaled on PDCCH with DCI format 3/3A.

FIG. 13 is a diagram illustrating power headroom reporting according to the seventh embodiment of the present invention.

Referring to FIG. 13, in a case where the LTE-Advanced system allows transmission over both PUSCH and PUCCH in the same subframe, in response to occurrence of an event requesting power headroom reporting, the mobile terminal may report $PH_{PUSCH}$ 1306 and $PH_{PUSCH+PUCCH}$ 1307 to the base station according to Equations 12, 13 and 14. The seventh embodiment of the present invention differs from the second embodiment of the present invention in that, according to the seventh embodiment of the present invention, when $\delta_{PUCCH}$ 1308 is signaled on PDCCH with DCI format 3/3A, the mobile terminal uses $\delta_{PUCCH}$ 1308 signaled on PDCCH with DCI format 3/3A to calculate g(i) 1309 and computes the transmit power $P_{PUCCH}$ 1304 according to Equations 13 and 14.

$PH_{PUSCH+PUCCH}$ 1307 is determined by subtracting the transmit power $P_{PUSCH}$ 1305 for PUSCH transmission 1302 calculated in subframe 4 and the transmit power $P_{PUCCH}$ 1304 from the maximum transmit power according to the power class of the mobile terminal ($P_{CMAX}$). In computation of $P_{PUCCH}$ 1304, the latest PUCCH transmission 1301 is used, $h(n_{CQI}, n_{HARQ})=0$ and $\Delta_{F\_PUCCH}(F)=0$ are used in Equations 13 and 14, and $\delta_{PUCCH}$ 1308 is used to calculate g(i) 1309.

Eighth Embodiment of the Present Invention

According to the second embodiment of the present invention, in order to prevent a problem in power control caused by different $h(n_{CQI}, n_{HARQ})$ values depending on PUCCH formats, the mobile terminal sends a PH report with $h(n_{CQI}, n_{HARQ})=0$ or $\Delta_{F\_PUCCH}(F)=0$ (Equation 14) to the base station.

By contrast, according to the eighth embodiment of the present invention, in order to prevent a problem in power control that may be caused by a difference between the PUCCH format expected by the base station and the PUCCH format actually used by the mobile terminal, the mobile terminal sends a PH report with 3-bit indication to the PUCCH format (e.g., 1, 1a, 1b, 2, 2a and 2b) to the base station.

Although embodiments of the present invention have been described in detail hereinabove, it should be understood that many variations and modifications of the basic inventive concept herein described, which may appear to those skilled in the art, will still fall within the spirit and scope of the embodiments of the present invention as defined in the appended claims.

What is claimed is:

1. A method of reporting power headroom for a User Equipment (UE), the method comprising the steps of:
    receiving at least one of power control information associated with a Physical Uplink Shared Channel (PUSCH) transmission in a subframe and power control information associated with a Physical Uplink Control Channel (PUCCH) transmission in the subframe;
    conditionally generating one of a first power headroom information and a second power headroom information, wherein the first power headroom information is generated by subtracting a transmit power for the PUSCH transmission from a maximum transmit power of the UE in the subframe based on the at least one of the power control information associated with the PUSCH transmission and the power control information associated with the PUCCH transmission,
    the second power headroom information is generated by subtracting the transmit power for the PUSCH transmission and a transmit power for the PUCCH transmission from the maximum transmit power of the UE in the subframe based on the power control information associated with the PUSCH transmission and the power control information associated with the PUCCH transmission; and
    conditionally transmitting one of the first power headroom information and the second power headroom information,
    wherein, if the UE transmits the PUSCH without the PUCCH in the subframe, the second power headroom information is generated by subtracting the transmit power for the PUSCH transmission and a transmit power for a PUCCH from the maximum transmit power of the UE in the subframe based on the power control information associated with the PUSCH transmission and power control information associated with the latest PUCCH transmission.

2. The method of claim 1, wherein the transmit power for the PUCCH transmission is generated by using information related $P_{O\_PUCCH}$, information related to PL, information related to $h(n_{CQI}, n_{HARQ})$, information related to $\Delta_{F\_PUCCH}$ (F), and information related to g(i),
    where the information related to $P_{O\_PUCCH}$ is defined by summation of $P_{O\_NOMINAL\_PUCCH}$ and $P_{O\_UE\_PUCCH}$ provided by a higher layer,
    the information related to PL is configured by a downlink path-loss,
    the information related to $h(n_{CQI}, n_{HARQ})$ is a PUCCH format dependent value,
    the information related to $\Delta_{F\_PUCCH}(F)$ is provided by Radio Resource Control (RRC) signaling, and
    the information related g(i) is based on the power control information associated with the PUCCH transmission in the subframe.

3. The method of claim 1, wherein the power control information associated with the PUCCH transmission is defined based on Transmit Power Control (TPC) commands sent from the eNB.

4. The method of claim 1, further comprising receiving, at the UE, information regarding simultaneous transmission of the PUSCH and the PUCCH.

5. The method of claim 4, wherein the UE can conditionally transmit the second power headroom information, when the UE is allowed simultaneous transmission of the PUSCH and the PUCCH.

6. The method of claim 1, wherein if the UE transmits the PUSCH without the PUCCH in the subframe, the transmit power for a PUCCH is generated by using information related to $P_{O\_PUCCH}$, information related to PL and information related to g(i),
    wherein the information related to $P_{O\_PUCCH}$ is defined by summation of $P_{O\_NOMINAL\_PUCCH}$ and $P_{O\_UE\_PUCCH}$ provided by a higher layer,
    the information related to PL is configured by a downlink path-loss,
    the information related to g(i) is based on the power control information associated with the PUCCH transmission in the subframe.

7. The method of claim 6, wherein the transmit power for a PUCCH is generated by further using information related to PL, information related to $h(n_{CQI}, n_{HARQ})$, information related to $\Delta_{F\_PUCCH}(F)$, wherein the information related to $h(n_{CQI}, n_{HARQ})$ and the information related to $\Delta_{F\_PUCCH}(F)$ are set to 0, if the UE does not transmit the PUCCH for the second power headroom information.

8. An apparatus for reporting power headroom comprising:
a User Equipment (UE),
wherein the UE is configured to perform:
receiving at least one of power control information associated with a Physical Uplink Shared Channel (PUSCH) transmission and power control information associated with a Physical Uplink Control Channel (PUCCH) transmission in the subframe;
conditionally generating one of a first power headroom information and a second power headroom information, wherein the first power headroom information is generated by subtracting a transmit power for the PUSCH transmission from a maximum transmit power of the UE in the subframe based on the at least one of the power control information associated with the PUSCH transmission and the power control information associated with the PUCCH transmission,
the second power headroom information is generated by subtracting the transmit power for the PUSCH transmission and a transmit power for the PUCCH transmission from the maximum transmit power of the UE in the subframe based on the power control information associated with the PUSCH transmission and the power control information associated with the PUCCH transmission; and
conditionally transmitting one of the first power headroom information and the second power headroom information,
wherein, if the UE transmits the PUSCH without the PUCCH in the subframe, the second power headroom information is generated by subtracting the transmit power for the PUSCH transmission and a transmit power for a PUCCH from the maximum transmit power of the UE in the subframe based on the power control information associated with the PUSCH transmission and power control information associated with the latest PUCCH transmission.

9. The apparatus of claim 8, wherein the transmit power for the PUCCH transmission is generated by using information related $P_{O\_PUCCH}$, information related to PL, information related to $h(n_{CQI}, n_{HARQ})$, information related to $\Delta F_{\_PUCCH}(F)$, and information related to $g(i)$, where the information related to $P_{O\_PUCCH}$ is defined by summation of $P_{O\_NOMINAL\_PUCCH}$ and $P_{O\_UE\_PUCCH}$ provided by a higher layer,
the information related to PL is configured by a downlink path-loss,
the information related to $h(n_{CQI}, n_{HARQ})$ is a PUCCH format dependent value,
the information related to $\Delta_{F\_PUCCH}(F)$ is provided by Radio Resource Control (RRC) signaling, and
the information related $g(i)$ is based on the power control information associated with the PUCCH transmission in the subframe.

10. The apparatus of claim 8, wherein the power control information associated with the PUCCH transmission is defined based on Transmit Power Control (TPC) commands sent from the eNB.

11. The apparatus of claim 8, further comprising receiving, at the UE, information regarding simultaneous transmission of the PUSCH and the PUCCH.

12. The apparatus of claim 11, wherein the UE can conditionally transmit the second power headroom information, when the UE is allowed simultaneous transmission of the PUSCH and the PUCCH.

13. The apparatus of claim 8, wherein if the UE transmits the PUSCH without the PUCCH in the subframe, the transmit power for a PUCCH is generated by using information related to $P_{O\_PUCCH}$, information related to PL and information related to $g(i)$, wherein the information related to $P_{O\_PUCCH}$ is defined by summation of $P_{O\_NOMINAL\_PUCCH}$ and $P_{O\_UE\_PUCCH}$ provided by a higher layer,
the information related to PL is configured by a downlink path-loss,
the information related to $g(i)$ is based on the power control information associated with the PUCCH transmission in the subframe.

14. The apparatus of claim 13, wherein the transmit power for a PUCCH is generated by further using information related to PL, information related to $h(n_{CQI}, n_{HARQ})$, information related to $\Delta_{F\_PUCCH}(F)$, wherein the information related to $h(n_{CQI}, n_{HARQ})$ and the information related to $\Delta F_{\_PUCCH}(F)$ are set to 0, if the UE does not transmit the PUCCH for the second power headroom information.

15. A method of receiving power headroom from a User Equipment (UE), the method comprising the steps of:
transmitting, to the UE, at least one of power control information associated with a Physical Uplink Shared Channel (PUSCH) transmission in a subframe and power control information associated with a Physical Uplink Control Channel (PUCCH) transmission in the subframe;
conditionally receiving one of a first power headroom information and a second power headroom information from the UE,
wherein the first power headroom information is generated by subtracting a transmit power for the PUSCH transmission from a maximum transmit power of the UE in the subframe based on the at least one of the power control information associated with the PUSCH transmission and the power control information associated with the PUCCH transmission,
the second power headroom information is generated by subtracting the transmit power for the PUSCH transmission and a transmit power for the PUCCH transmission from the maximum transmit power of the UE in the subframe based on the power control information associated with the PUSCH transmission and the power control information associated with the PUCCH transmission, and
wherein, if the UE transmits the PUSCH without the PUCCH in the subframe, the second power headroom information is generated by subtracting the transmit power for the PUSCH transmission and a transmit power for a PUCCH from the maximum transmit power of the UE in the subframe based on the power control information associated with the PUSCH transmission and power control information associated with the latest PUCCH transmission.

16. The method of claim 15, wherein the transmit power for the PUCCH transmission is generated by using information related $P_{O\_PUCCH}$, information related to PL, information related to $h(n_{CQI}, n_{HARQ})$, information related to $\Delta_{F\_PUCCH}$ (F), and information related to g(i),
- where the information related to $P_{O\_PUCCH}$ is defined by summation of $P_{O\_NOMINAL}$ and $P_{O\_UE\_PUCCH}$ provided by a higher layer,
- the information related to PL is configured by a downlink path-loss,
- the information related to $h(n_{CQI}, n_{HARQ})$ is a PUCCH format dependent value,
- the information related to $\Delta_{F\_PUCCH}$(F) is provided by Radio Resource Control (RRC) signaling, and
- the information related g(i) is based on the power control information associated with the PUCCH transmission in the subframe.

17. The method of claim 15, wherein the power control information associated with the PUCCH transmission is defined based on Transmit Power Control (TPC) commands sent from the eNB.

18. The method of claim 15, further comprising transmitting, to the UE, information regarding simultaneous transmission of the PUSCH and the PUCCH.

19. The method of claim 18, wherein the UE can conditionally transmit the second power headroom information, when the UE is allowed simultaneous transmission of the PUSCH and the PUCCH.

20. The method of claim 15, wherein if the UE transmits the PUSCH without the PUCCH in the subframe, the transmit power for a PUCCH is generated by using information related to $P_{O\_PUCCH}$, information related to PL and information related to g(i),
- wherein the information related to $P_{O\_PUCCH}$ is defined by summation of $P_{O\_NOMINAL\_PUCCH}$ and $P_{O\_UE\_PUCCH}$ provided by a higher layer,
- the information related to PL is configured by a downlink path-loss,
- the information related to g(i) is based on the power control information associated with the PUCCH transmission in the subframe.

21. The method of claim 20, wherein the transmit power for a PUCCH is generated by further using information related to PL, information related to $h(n_{CQI}, n_{HARQ})$, information related to $\Delta_{F\_PUCCH}$(F),
- wherein the information related to $h(n_{CQI}, n_{HARQ})$ and the information related to $\Delta F_{\_PUCCH}$(F) are set to 0, if the UE does not transmit the PUCCH for the second power headroom information.

22. An apparatus for receiving power headroom comprising:
- a transmitter configured to transmit, to a User Equipment (UE), at least one of power control information associated with a Physical Uplink Shared Channel (PUSCH) transmission and power control information associated with a Physical Uplink Control Channel (PUCCH) transmission in the subframe;
- a receiver configured to conditionally receive one of a first power headroom information and a second power headroom information from the UE,
- wherein the first power headroom information is generated by subtracting a transmit power for the PUSCH transmission from a maximum transmit power of the UE in the subframe based on the at least one of the power control information associated with the PUSCH transmission and the power control information associated with the PUCCH transmission,
- the second power headroom information is generated by subtracting the transmit power for the PUSCH transmission and a transmit power for the PUCCH transmission from the maximum transmit power of the UE in the subframe based on the power control information associated with the PUSCH transmission and the power control information associated with the PUCCH transmission, and
- wherein, if the UE transmits the PUSCH without the PUCCH in the subframe, the second power headroom information is generated by subtracting the transmit power for the PUSCH transmission and a transmit power for a PUCCH from the maximum transmit power of the UE in the subframe based on the power control information associated with the PUSCH transmission and power control information associated with the latest PUCCH transmission.

23. The apparatus of claim 22, wherein the transmit power for the PUCCH transmission is generated by using information related $P_{O\_PUCCH}$, information related to PL, information related to $h(n_{CQI}, n_{HARQ})$, information related to $\Delta_{F\_PUCCH}$(F), and information related to g(i),
- where the information related to $P_{O\_PUCCH}$ is defined by summation of $P_{O\_NOMINAL\_PUCCH}$ and $P_{O\_UE\_PUCCH}$ provided by a higher layer,
- the information related to PL is configured by a downlink path-loss,
- the information related to $h(n_{CQI}, n_{HARQ})$ is a PUCCH format dependent value,
- the information related to $\Delta_{F\_PUCCH}$(F) is provided by Radio Resource Control (RRC) signaling, and
- the information related g(i) is based on the power control information associated with the PUCCH transmission in the subframe.

24. The apparatus of claim 22, wherein the power control information associated with the PUCCH transmission is defined based on Transmit Power Control (TPC) commands sent from the eNB.

25. The apparatus of claim 22, wherein the transmitter transmits, to the UE, information regarding simultaneous transmission of the PUSCH and the PUCCH.

26. The apparatus of claim 25, wherein the UE can conditionally transmit the second power headroom information, when the UE is allowed simultaneous transmission of the PUSCH and the PUCCH.

27. The apparatus of claim 22, wherein if the UE transmits the PUSCH without the PUCCH in the subframe, the transmit power for a PUCCH is generated by using information related to $P_{O\_PUCCH}$, information related to PL and information related to g(i),
- wherein the information related to $P_{O\_PUCCH}$ is defined by summation of $P_{O\_NOMINAL\_PUCCH}$ and $P_{O\_UE\_PUCCH}$ provided by a higher layer,
- the information related to PL is configured by a downlink path-loss,
- the information related to g(i) is based on the power control information associated with the PUCCH transmission in the subframe.

28. The apparatus of claim 27, wherein the transmit power for a PUCCH is generated by further using information related to PL, information related to $h(n_{CQI}, n_{HARQ})$, information related to $\Delta_{F\_PUCCH}$(F),
wherein the information related to $h(n_{CQI}, n_{HARQ})$ and the information related to $\Delta F_{\_PUCCH}$(F) are set to 0, if the UE does not transmit the PUCCH for the second power headroom information.

* * * * *